(12) United States Patent
Van Nee et al.

(10) Patent No.: US 9,231,806 B2
(45) Date of Patent: Jan. 5, 2016

(54) PREAMBLE EXTENSIONS

(71) Applicant: QUALCOMM Incorporated, San Diego, CA (US)

(72) Inventors: Didier Johannes Richard Van Nee, Tull en't Waal (NL); Albert Van Zelst, Woerden (NL); Hemanth Sampath, San Diego, CA (US); Geert Arnout Awater, Utrecht (NL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/089,963

(22) Filed: Nov. 26, 2013

(65) Prior Publication Data

US 2014/0079048 A1 Mar. 20, 2014

Related U.S. Application Data

(63) Continuation of application No. 12/832,766, filed on Jul. 8, 2010, now abandoned, which is a continuation-in-part of application No. 12/428,129, filed on Apr. 22, 2009, now abandoned.

(Continued)

(51) Int. Cl.
*H04B 7/02* (2006.01)
*H04L 27/26* (2006.01)
*H04B 7/04* (2006.01)
*H04B 7/06* (2006.01)
*H04L 5/00* (2006.01)

(52) U.S. Cl.
CPC .......... *H04L 27/2605* (2013.01); *H04B 7/0452* (2013.01); *H04B 7/0671* (2013.01); *H04B 7/0684* (2013.01); *H04L 5/0023* (2013.01); *H04L 5/0048* (2013.01); *H04L 5/0051* (2013.01)

(58) Field of Classification Search
CPC .... H04B 7/0452; H04B 7/067; H04B 7/0684; H04L 5/0023; H04L 5/0048; H04L 5/0051; H04L 27/2605
USPC ........................................................ 375/267
See application file for complete search history.

(56) References Cited

U.S. PATENT DOCUMENTS 5,537,410 A   7/1996 Li
5,541,955 A   7/1996 Jacobsmeyer
(Continued)

FOREIGN PATENT DOCUMENTS

CN   101001230 A   7/2007
CN   101142775 A   3/2008
(Continued)

OTHER PUBLICATIONS

Al Petrick., "IEEE 802.11 WLAN Standards for Wi-Fi Solutions Today and Tomorrow", IEEE 802 Wireless standards Educational Workshop, Nov. 30-Dec. 1, 2007, p. 22.

(Continued)

*Primary Examiner* — Juan A Torres
(74) *Attorney, Agent, or Firm* — Eric Ho

(57) ABSTRACT

Systems and/or methods for communication generate a plurality of spatial streams. Each of the spatial streams comprises a plurality of symbols. At least a portion of a training sequence is distributed across a first symbol in a first one of the spatial streams and a second symbol in a second one of the spatial streams.

42 Claims, 32 Drawing Sheets

Related U.S. Application Data

(60) Provisional application No. 61/090,434, filed on Aug. 20, 2008, provisional application No. 61/224,642, filed on Jul. 10, 2009, provisional application No. 61/290,419, filed on Dec. 28, 2009.

(56) References Cited

U.S. PATENT DOCUMENTS

| | | | |
|---|---|---|---|
| 5,815,488 | A | 9/1998 | Williams et al. |
| 6,373,861 | B1 | 4/2002 | Lee |
| 6,950,444 | B1 | 9/2005 | Holmquist et al. |
| 7,269,430 | B2 | 9/2007 | Moorti et al. |
| 7,352,688 | B1 | 4/2008 | Perahia et al. |
| 7,711,061 | B2 | 5/2010 | Trachewsky |
| 7,738,538 | B1 | 6/2010 | Tung |
| 7,995,455 | B1 | 8/2011 | Narasimhan et al. |
| 8,077,696 | B2 | 12/2011 | Izumi et al. |
| 8,351,519 | B2 | 1/2013 | Aggarwal et al. |
| 2005/0220209 | A1 | 10/2005 | Lewis |
| 2005/0271157 | A1 | 12/2005 | Van Zelst et al. |
| 2005/0276347 | A1 | 12/2005 | Mujtaba et al. |
| 2005/0281241 | A1 | 12/2005 | Webster et al. |
| 2005/0286474 | A1 | 12/2005 | Van Zelst et al. |
| 2006/0056530 | A1 | 3/2006 | Nakao |
| 2006/0140303 | A1 | 6/2006 | Egashira et al. |
| 2006/0176972 | A1 | 8/2006 | Kim et al. |
| 2006/0182017 | A1 | 8/2006 | Hansen et al. |
| 2006/0193340 | A1 | 8/2006 | Jones et al. |
| 2006/0274852 | A1 | 12/2006 | Trachewsky et al. |
| 2007/0002749 | A1 | 1/2007 | Sondur et al. |
| 2007/0064591 | A1 | 3/2007 | Nakao |
| 2007/0097946 | A1 | 5/2007 | Mujtaba |
| 2007/0104089 | A1 | 5/2007 | Mujtaba |
| 2007/0201575 | A1 | 8/2007 | Ariyavisitakul et al. |
| 2007/0232344 | A1 | 10/2007 | Aoki et al. |
| 2007/0253501 | A1 | 11/2007 | Yamaura |
| 2007/0275669 | A1 | 11/2007 | Rietman et al. |
| 2007/0298742 | A1 | 12/2007 | Ketchum et al. |
| 2008/0299962 | A1 | 12/2008 | Kasher |
| 2009/0031185 | A1 | 1/2009 | Xhafa et al. |
| 2009/0097455 | A1 | 4/2009 | Hoffmann et al. |
| 2009/0225727 | A1 | 9/2009 | Chen |
| 2009/0296925 | A1 | 12/2009 | Kishiyama et al. |
| 2010/0046656 | A1 | 2/2010 | Van Nee et al. |
| 2010/0290449 | A1 | 11/2010 | Van Nee et al. |
| 2010/0290548 | A1 | 11/2010 | Hoshino et al. |
| 2014/0029685 | A1 | 1/2014 | Van Nee et al. |

FOREIGN PATENT DOCUMENTS

| | | | |
|---|---|---|---|
| EP | 1693972 | A2 | 8/2006 |
| JP | 2005294996 | A | 10/2005 |
| JP | 2006109104 | A | 4/2006 |
| JP | 2007089129 | A | 4/2007 |
| JP | 2007214822 | A | 8/2007 |
| JP | 2007295544 | A | 11/2007 |
| JP | 2007318729 | A | 12/2007 |
| JP | 2008017143 | A | 1/2008 |
| JP | 2008500783 | A | 1/2008 |
| JP | 2008502197 | A | 1/2008 |
| TW | 200840287 | A | 10/2008 |
| WO | 2005119922 | A2 | 12/2005 |
| WO | 2005119985 | A1 | 12/2005 |
| WO | 2006018367 | A1 | 2/2006 |
| WO | WO-2009029730 | A1 | 3/2009 |
| WO | WO-2009081514 | A1 | 7/2009 |

OTHER PUBLICATIONS

AirMagnet (Mar. 2008). "Impact of Legacy Devices on 802.11n Networks", Whitepaper, pp. 1-15. Retrieved from http://www.nle.com/literature/Airmagnet_impact_of_legacy_devices_on_80211n.pdf.

Gross J et al., "Dynamic Multi-user OFDM for 802.11 systems. IEEE 802.11-07/2062r1" [Online] Jul. 15, 2007, pp. 1-23, XP002554723 Retrieved from the Interet: URL:www.tkn.tu-berlin.de/publications/papers/11-07-2062-01.pdf>.

IEEE80211 nD5 "Draft Standard for Information Technology—Telecommunications and information exchange between systems—Local and Metropolitan area networks—Specific requirements—Part 11 : Wireless LAN Medium Access Control (MAC) and Physical Layer (PHY) specifications: Amendment 5: Enhancements for Higher Throughput" pp. 241-265 and 344-354, May 2008.

Mujtaba S.A., "TGnSync Proposal Technical Specification; 11-04-0889-07-000n-tgnsync-proposal-technical-specification", IEEE Draft; 11-04-0889-07-000N-TGNSYNC-Proposal-Technical-Specification, IEEE-SA Mentor, Piscataway, NJ USA, vol. 802.11n, No. 7, Jul. 8, 2005, pp. 1-133, XP017690449.

Nee R.V., et al., "The 802.11n MIMO-OFDM Standard for Wireless LAN and beyond", Wireless Personal Communications, Kluwer Academic Publishers, DO, vol. 37, No. 3-4, Jun. 2, 2006, pp. 445-453, XP019410646, ISSN: 1572-834X. DOI: 10.1007/S11277-006-9073-2.

Nee V., "LSIG Spoof Length Error", Jul. 2007.

Syafei W A, et al., "Design of 600 Mbps MIMO wireless LAN system using GLST coding and its FPGA implementation" Radio and Wireless Symposium, 2009. RWS '09. IEEE, IEEE, Piscataway, NJ, USA, Jan. 18, 2009, pp. 296-299, XP031457393 ISBN: 978-1-4244-2698-0.

Wu, H.C., et al., "Novel carrier frequency offset mitigation in IEEE802.11a/g/n systems," Wireless and Optical Communications Networks, 2009. WOCN '09. IFIP International Conference on, IEEE, Piscataway, NJ, USA, Apr. 28, 2009, pp. 1-4, XP031466808, ISBN: 978-1-4244-4704-6 paragraph [0001].

FIG. 6

602:
| STF 0 ns CD | HT-LTF 0 ns CD | HT-SIG3 0 ns CD | -HT-LTF 0 ns CD | HT-LTF 0 ns CD | HT-LTF 0 ns CD | Data 0 ns CD | ... | Data 0 ns CD |
|---|---|---|---|---|---|---|---|---|
| 8 µs | 8 µs | 4 µs | 4 µs | 4 µs | 4 µs | 4 µs | | 4 µs |

604:
| STF -400 ns CD | HT-LTF -400 ns CD | HT-SIG3 -400 ns CD | HT-LTF -400 ns CD | HT-LTF -400 ns CD | HT-LTF -400 ns CD | Data -400 ns CD | ... | Data -400 ns CD |

606:
| STF -200 ns CD | HT-LTF -200 ns CD | HT-SIG3 -200 ns CD | HT-LTF -200 ns CD | HT-LTF -200 ns CD | -HT-LTF -200 ns CD | Data -200 ns CD | ... | Data -200 ns CD |

608:
| STF -600 ns CD | -HT-LTF -600 ns CD | -HT-SIG3 -600 ns CD | HT-LTF -600 ns CD | HT-LTF -600 ns CD | HT-LTF -600 ns CD | Data -600 ns CD | ... | Data -600 ns CD |

600

800

Shortened channel training for 4 spatial streams

| HT-LTF 0 ns CD | HT-LTF 0 ns CD | 802 |
| HT-LTF 1600 ns CD | HT-LTF 1600 ns CD | 804 |
| HT-LTF -200 ns CD | -HT-LTF -200 ns CD | 806 |
| HT-LTF 1400 ns CD | -HT-LTF 1400 ns CD | 808 |

| HT-LTF  | HT-LTF  | HT-LTF  | HT-LTF  | 902
| 0 ns CD | 0 ns CD | 0 ns CD | 0 ns CD |

| HT-LTF     | HT-LTF     | HT-LTF     | HT-LTF     | 904
| 1600 ns CD | 1600 ns CD | 1600 ns CD | 1600 ns CD |

| HT-LTF     | -HT-LTF    | HT-LTF     | -HT-LTF    | 906
| -200 ns CD | -200 ns CD | -200 ns CD | -200 ns CD |

| HT-LTF     | -HT-LTF    | HT-LTF     | -HT-LTF    | 908
| 1400 ns CD | 1400 ns CD | 1400 ns CD | 1400 ns CD |

| HT-LTF  | HT-LTF  | -HT-LTF | -HT-LTF | 910
| 0 ns CD | 0 ns CD | 0 ns CD | 0 ns CD |

| HT-LTF     | HT-LTF     | -HT-LTF    | -HT-LTF    | 912
| 1600 ns CD | 1600 ns CD | 1600 ns CD | 1600 ns CD |

| HT-LTF     | -HT-LTF    | -HT-LTF    | HT-LTF     | 914
| -200 ns CD | -200 ns CD | -200 ns CD | -200 ns CD |

| HT-LTF     | -HT-LTF    | -HT-LTF    | HT-LTF     | 916
| 1400 ns CD | 1400 ns CD | 1400 ns CD | 1400 ns CD |

| | | |
|---|---|---|
| 1002 | HT-LTF 0 ns CD | HT-LTF 0 ns CD |
| 1004 | HT-LTF 800 ns CD | HT-LTF 800 ns CD |
| 1006 | HT-LTF 1600 ns CD | HT-LTF 1600 ns CD |
| 1008 | HT-LTF 2400 ns CD | HT-LTF 2400 ns CD |
| 1010 | HT-LTF 0 ns CD | -HT-LTF 0 ns CD |
| 1012 | HT-LTF 800 ns CD | -HT-LTF 800 ns CD |
| 1014 | HT-LTF 1600 ns CD | -HT-LTF 1600 ns CD |
| 1016 | HT-LTF 2400 ns CD | -HT-LTF 2400 ns CD |
| | 4 μs | 4 μs |

| # | STF | HT-LTF | HT-SIG3 | HT-LTF | HT-LTF | HT-LTF | Data | ... | Data |
|---|---|---|---|---|---|---|---|---|---|
| 1102 | STF 0 ns CD | HT-LTF 0 ns CD | HT-SIG3 0 ns CD | HT-LTF 0 ns CD | HT-LTF 0 ns CD | HT-LTF 0 ns CD | Data 0 ns CD | ... | Data 0 ns CD |
| 1104 | STF -400 ns CD | HT-LTF 1600 ns CD | HT-SIG3 1600 ns CD | HT-LTF 1600 ns CD | HT-LTF 1600 ns CD | HT-LTF 1600 ns CD | Data 1600 ns CD | ... | Data 1600 ns CD |
| 1106 | STF -200 ns CD | HT-LTF -200 ns CD | HT-SIG3 -200 ns CD | HT-LTF -200 ns CD | HT-LTF -200 ns CD | -HT-LTF -200 ns CD | Data -200 ns CD | ... | Data -200 ns CD |
| 1108 | STF -600 ns CD | -HT-LTF 1400 ns CD | -HT-SIG3 1400 ns CD | -HT-LTF 1400 ns CD | HT-LTF 1400 ns CD | -HT-LTF 1400 ns CD | Data 1400 ns CD | ... | Data 1400 ns CD |
| 1110 | STF -100 ns CD | HT-LTF -100 ns CD | HT-SIG3 -100 ns CD | HT-LTF -100 ns CD | -HT-LTF -100 ns CD | -HT-LTF -100 ns CD | Data -100 ns CD | ... | Data -100 ns CD |
| 1112 | STF -500 ns CD | HT-LTF 1500 ns CD | HT-SIG3 1500 ns CD | HT-LTF 1500 ns CD | -HT-LTF 1500 ns CD | HT-LTF 1500 ns CD | Data 1500 ns CD | ... | Data 1500 ns CD |
| 1114 | STF -300 ns CD | -HT-LTF -300 ns CD | HT-SIG3 -300 ns CD | -HT-LTF -300 ns CD | -HT-LTF -300 ns CD | -HT-LTF -300 ns CD | Data -300 ns CD | ... | Data -300 ns CD |
| 1116 | STF -700 ns CD | -HT-LTF 1300 ns CD | -HT-SIG3 1300 ns CD | -HT-LTF 1300 ns CD | -HT-LTF 1300 ns CD | HT-LTF 1300 ns CD | Data 1300 ns CD | ... | Data 1300 ns CD |
| | 8 μs | 8 μs | 4 μs | 6 μs | 6 μs | 6 μs | 4 μs | | 4 μs |

1100

1200

| | | | | | | | | |
|---|---|---|---|---|---|---|---|---|
| 1202 | HT-LTF 0 ns CD | HT-LTF 0 ns CD | HT-LTF 0 ns CD | HT-LTF 0 ns CD | HT-LTF 0 ns CD | HT-LTF 0 ns CD | HT-LTF 0 ns CD | HT-LTF 0 ns CD |
| 1204 | HT-LTF 1600 ns CD | HT-LTF 1600 ns CD | HT-LTF 1600 ns CD | HT-LTF 1600 ns CD | HT-LTF 1600 ns CD | HT-LTF 1600 ns CD | HT-LTF 1600 ns CD | HT-LTF 1600 ns CD |
| 1206 | HT-LTF -200 ns CD | -HT-LTF -200 ns CD | HT-LTF -200 ns CD | -HT-LTF -200 ns CD | HT-LTF -200 ns CD | -HT-LTF -200 ns CD | HT-LTF -200 ns CD | -HT-LTF -200 ns CD |
| 1208 | HT-LTF 1400 ns CD | -HT-LTF 1400 ns CD | HT-LTF 1400 ns CD | -HT-LTF 1400 ns CD | HT-LTF 1400 ns CD | -HT-LTF 1400 ns CD | HT-LTF 1400 ns CD | -HT-LTF 1400 ns CD |
| 1210 | HT-LTF 0 ns CD | HT-LTF 0 ns CD | -HT-LTF 0 ns CD | -HT-LTF 0 ns CD | HT-LTF 0 ns CD | HT-LTF 0 ns CD | -HT-LTF 0 ns CD | -HT-LTF 0 ns CD |
| 1212 | HT-LTF 1600 ns CD | HT-LTF 1600 ns CD | -HT-LTF 1600 ns CD | -HT-LTF 1600 ns CD | HT-LTF 1600 ns CD | HT-LTF 1600 ns CD | -HT-LTF 1600 ns CD | -HT-LTF 1600 ns CD |
| 1214 | HT-LTF -200 ns CD | -HT-LTF -200 ns CD | -HT-LTF -200 ns CD | HT-LTF -200 ns CD | HT-LTF -200 ns CD | -HT-LTF -200 ns CD | -HT-LTF -200 ns CD | HT-LTF -200 ns CD |
| 1216 | HT-LTF 1400 ns CD | -HT-LTF 1400 ns CD | -HT-LTF 1400 ns CD | HT-LTF 1400 ns CD | HT-LTF 1400 ns CD | -HT-LTF 1400 ns CD | -HT-LTF 1400 ns CD | HT-LTF 1400 ns CD |
| 1218 | HT-LTF 0 ns CD | HT-LTF 0 ns CD | HT-LTF 0 ns CD | HT-LTF 0 ns CD | -HT-LTF 0 ns CD | -HT-LTF 0 ns CD | -HT-LTF 0 ns CD | -HT-LTF 0 ns CD |
| 1220 | HT-LTF 1600 ns CD | HT-LTF 1600 ns CD | HT-LTF 1600 ns CD | HT-LTF 1600 ns CD | -HT-LTF 1600 ns CD | -HT-LTF 1600 ns CD | -HT-LTF 1600 ns CD | -HT-LTF 1600 ns CD |
| 1222 | HT-LTF -200 ns CD | -HT-LTF -200 ns CD | HT-LTF -200 ns CD | -HT-LTF -200 ns CD | -HT-LTF -200 ns CD | HT-LTF -200 ns CD | -HT-LTF -200 ns CD | HT-LTF -200 ns CD |
| 1224 | HT-LTF 1400 ns CD | -HT-LTF 1400 ns CD | HT-LTF 1400 ns CD | -HT-LTF 1400 ns CD | -HT-LTF 1400 ns CD | HT-LTF 1400 ns CD | -HT-LTF 1400 ns CD | HT-LTF 1400 ns CD |
| 1226 | HT-LTF 0 ns CD | HT-LTF 0 ns CD | -HT-LTF 0 ns CD | -HT-LTF 0 ns CD | -HT-LTF 0 ns CD | -HT-LTF 0 ns CD | HT-LTF 0 ns CD | HT-LTF 0 ns CD |
| 1228 | HT-LTF 1600 ns CD | HT-LTF 1600 ns CD | -HT-LTF 1600 ns CD | -HT-LTF 1600 ns CD | -HT-LTF 1600 ns CD | -HT-LTF 1600 ns CD | HT-LTF 1600 ns CD | HT-LTF 1600 ns CD |
| 1230 | HT-LTF -200 ns CD | -HT-LTF -200 ns CD | -HT-LTF -200 ns CD | HT-LTF -200 ns CD | -HT-LTF -200 ns CD | HT-LTF -200 ns CD | -HT-LTF -200 ns CD | -HT-LTF -200 ns CD |
| 1232 | HT-LTF 1400 ns CD | -HT-LTF 1400 ns CD | -HT-LTF 1400 ns CD | HT-LTF 1400 ns CD | -HT-LTF 1400 ns CD | HT-LTF 1400 ns CD | HT-LTF 1400 ns CD | -HT-LTF 1400 ns CD |
| | 4 μs | 4 μs | 4 μs | 4 μs | 4 μs | 4 μs | 4 μs | 4 μs |

FIG. 12

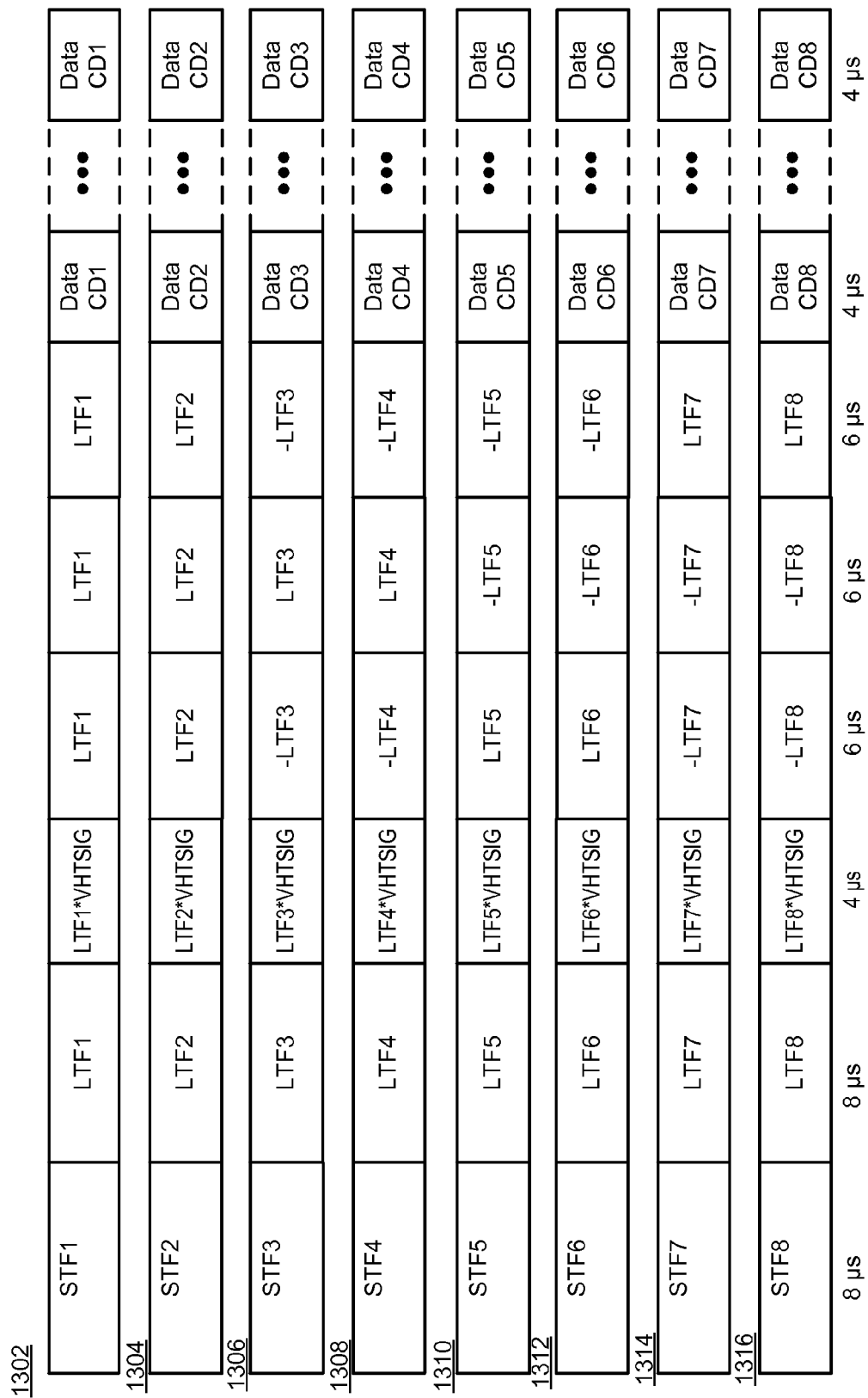

| | | | | | | | | | | | | |
|---|---|---|---|---|---|---|---|---|---|---|---|---|
| 2602 | VHT-STF1 | LTF1 CD1 | LTF1*VHTSIG1 CD1 | VHT-STF1 | LTF1 CD1 | LTF2 CD1 | LTF3 CD1 | LTF4 CD1 | LTF5 CD1 | LTF6 CD1 | LTF7 CD1 | LTF8 CD1 | LTF1 CD1 | VHT-STF1 | DATA CD1 | --- | DATA CD1 | USER 1 |
| 2604 | VHT-STF1 | LTF1 CD1 | LTF1*VHTSIG2 CD1 | VHT-STF1 | LTF2 CD2 | LTF3 CD2 | LTF4 CD2 | LTF5 CD2 | LTF6 CD2 | LTF7 CD2 | LTF8 CD2 | LTF1 CD1 | LTF2 CD1 | VHT-STF1 | DATA CD1 | --- | DATA CD1 | USER 2 |
| 2606 | VHT-STF1 | LTF1 CD1 | LTF1*VHTSIG3 CD1 | VHT-STF1 | LTF3 CD3 | LTF4 CD3 | LTF5 CD3 | LTF6 CD3 | LTF7 CD3 | LTF8 CD3 | LTF1 CD1 | LTF2 CD2 | LTF3 CD1 | VHT-STF1 | DATA CD1 | --- | DATA CD1 | USER 3 |
| 2608 | VHT-STF1 | LTF1 CD1 | LTF1*VHTSIG4 CD1 | VHT-STF1 | LTF4 CD4 | LTF5 CD4 | LTF6 CD4 | LTF7 CD4 | LTF8 CD4 | LTF1 CD1 | LTF2 CD2 | LTF3 CD3 | LTF4 CD1 | VHT-STF1 | DATA CD1 | --- | DATA CD1 | USER 4 |
| 2610 | VHT-STF1 | LTF1 CD1 | LTF1*VHTSIG5 CD1 | VHT-STF1 | LTF5 CD5 | LTF6 CD5 | LTF7 CD5 | LTF8 CD5 | LTF1 CD1 | LTF2 CD2 | LTF3 CD3 | LTF4 CD4 | LTF5 CD1 | VHT-STF1 | DATA CD1 | --- | DATA CD1 | USER 5 |
| 2612 | VHT-STF2 | LTF2 CD2 | LTF2*VHTSIG5 CD2 | VHT-STF2 | LTF6 CD6 | LTF7 CD6 | LTF8 CD6 | LTF1 CD1 | LTF2 CD2 | LTF3 CD3 | LTF4 CD4 | LTF5 CD5 | LTF6 CD2 | VHT-STF2 | DATA CD2 | --- | DATA CD2 | |
| 2614 | VHT-STF3 | LTF3 CD3 | LTF3*VHTSIG5 CD3 | VHT-STF3 | LTF7 CD7 | LTF8 CD7 | LTF1 CD1 | LTF2 CD2 | LTF3 CD3 | LTF4 CD4 | LTF5 CD5 | LTF6 CD6 | LTF7 CD3 | VHT-STF3 | DATA CD3 | --- | DATA CD3 | |
| 2616 | VHT-STF4 | LTF4 CD4 | LTF4*VHTSIG5 CD4 | VHT-STF4 | LTF8 CD8 | LTF1 CD1 | LTF2 CD2 | LTF3 CD3 | LTF4 CD4 | LTF5 CD5 | LTF6 CD6 | LTF7 CD7 | LTF8 CD4 | VHT-STF4 | DATA CD4 | --- | DATA CD4 | |
| | 8 µs | 8 µs | 4 µs | 4 µs | 4 µs | 4 µs | 4 µs | 4 µs | 4 µs | 4 µs | 4 µs | 4 µs | 4 µs | 4 µs | 4 µs | | 4 µs | |

| | | | | | | | | | | |
|---|---|---|---|---|---|---|---|---|---|---|
| 2802 | L-STF L-CD1 | L-LTF L-CD1 | L-SIG L-CD1 | HT-SIG1 L-CD1 | HT-SIG2 L-CD1 | VHT-STF1 | LTF1 CD1 | LTF1*VHTSIG1 CD1 | VHT-STF1 | LTF1 CD1 | LTF2 CD1 | USER 1
| 2804 | L-STF L-CD2 | L-LTF L-CD2 | L-SIG L-CD2 | HT-SIG1 L-CD2 | HT-SIG2 L-CD2 | VHT-STF1 | LTF1 CD1 | LTF1*VHTSIG2 CD1 | VHT-STF1 | LTF2 CD2 | LTF3 CD2 | USER 2
| 2806 | L-STF L-CD3 | L-LTF L-CD3 | L-SIG L-CD3 | HT-SIG1 L-CD3 | HT-SIG2 L-CD3 | VHT-STF1 | LTF1 CD1 | LTF1*VHTSIG3 CD1 | VHT-STF1 | LTF3 CD3 | LTF4 CD3 | USER 3
| 2808 | L-STF L-CD4 | L-LTF L-CD4 | L-SIG L-CD4 | HT-SIG1 L-CD4 | HT-SIG2 L-CD4 | VHT-STF1 | LTF1 CD1 | LTF1*VHTSIG4 CD1 | VHT-STF1 | LTF4 CD4 | LTF5 CD4 | USER 4
| 2810 | L-STF L-CD5 | L-LTF L-CD5 | L-SIG L-CD5 | HT-SIG1 L-CD5 | HT-SIG2 L-CD5 | VHT-STF1 | LTF1 CD1 | LTF1*VHTSIG5 CD1 | VHT-STF1 | LTF5 CD5 | LTF6 CD5 | USER 5
| 2812 | L-STF L-CD6 | L-LTF L-CD6 | L-SIG L-CD6 | HT-SIG1 L-CD6 | HT-SIG2 L-CD6 | VHT-STF2 | LTF2 CD2 | LTF2*VHTSIG5 CD2 | VHT-STF2 | LTF6 CD6 | LTF7 CD6 |
| 2814 | L-STF L-CD7 | L-LTF L-CD7 | L-SIG L-CD7 | HT-SIG1 L-CD7 | HT-SIG2 L-CD7 | VHT-STF3 | LTF3 CD3 | LTF3*VHTSIG5 CD3 | VHT-STF3 | LTF7 CD7 | LTF8 CD7 |
| 2816 | L-STF L-CD8 | | L-SIG L-CD8 | HT-SIG1 L-CD8 | HT-SIG2 L-CD8 | VHT-STF4 | LTF4 CD4 | LTF4*VHTSIG5 CD4 | VHT-STF4 | LTF8 CD8 | LTF1 CD8 |
| | 8 μs | 8 μs | 4 μs | 4 μs | 4 μs | 4 μs | 4 μs | 4 μs | 4 μs | 4 μs | 4 μs |

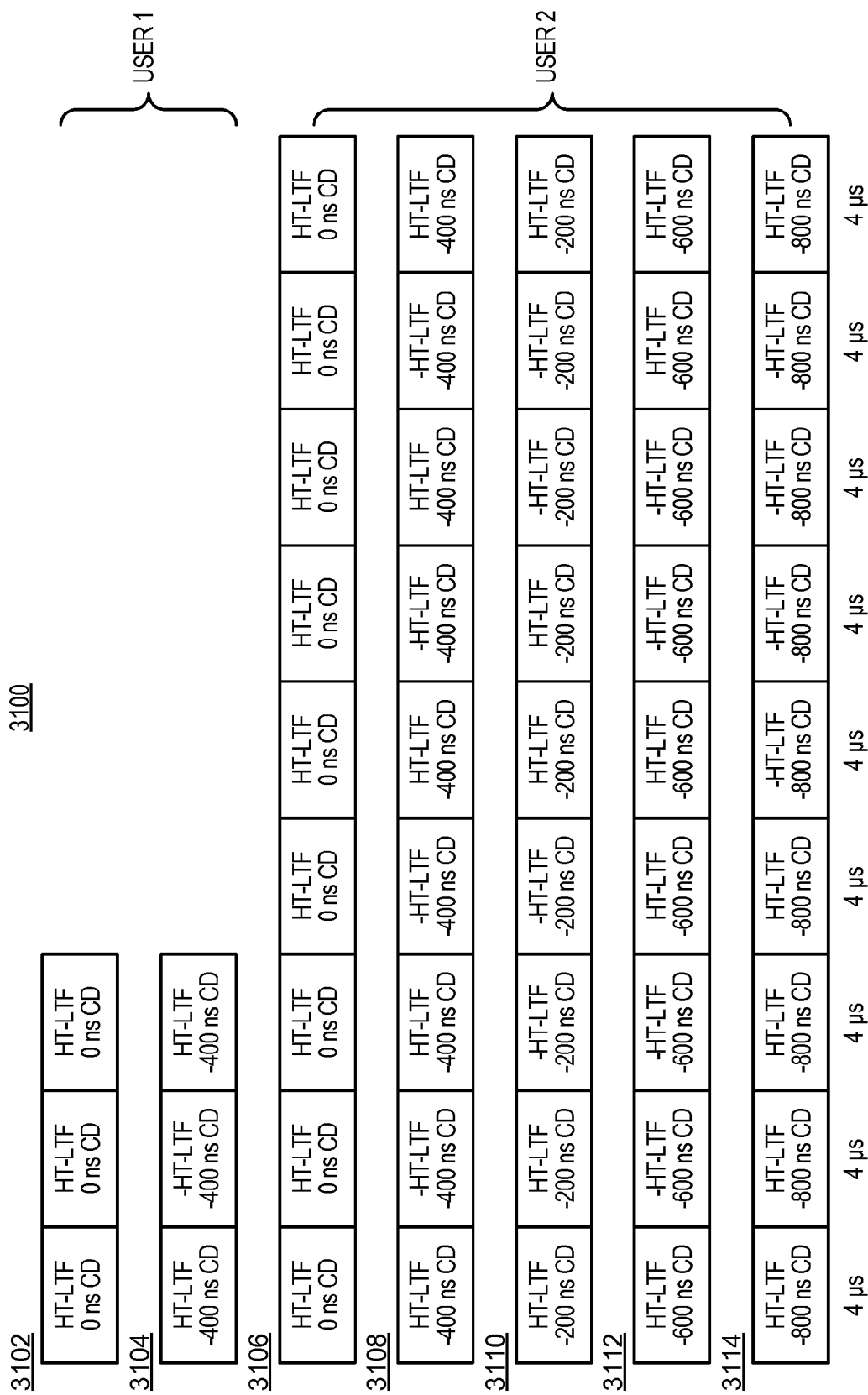

PREAMBLE EXTENSIONS

CLAIM OF PRIORITY UNDER 35 U.S.C. §§119 AND 120

This application is a continuation of pending U.S. patent application Ser. No. 12/832,766, entitled "Preamble Extensions" and filed Jul. 8, 2010, which is a continuation-in-part of U.S. patent application Ser. No. 12/428,129, entitled, "Preamble Extensions" and filed Apr. 22, 2009, which claims benefit of U.S. Provisional Patent Application No. 61/090,434, entitled, "Preamble Extensions" and filed Aug. 20, 2008; and also claims benefit of U.S. Provisional Patent Application Nos. 61/224,642, entitled "Preamble Extensions" and filed Jul. 10, 2009, and 61/290,419, entitled "Preamble Extensions" and filed Dec. 28, 2009; all of which are assigned to the assignee hereof and are hereby expressly incorporated by reference herein.

BACKGROUND

I. Field

The following description relates generally to communication systems, and more particularly to Preamble Extensions.

II. Background

In order to address the issue of increasing bandwidth requirements that are demanded for wireless communications systems, different schemes are being developed to allow multiple user terminals to communicate with a single access point by sharing channel resources while achieving high data throughputs. Multiple Input, Multiple Output (MIMO) technology represents one such approach that has recently emerged as a popular technique for next generation communication systems. MIMO technology has been adopted in several emerging wireless communications standards such as the Institute of Electrical and Electronics Engineers (IEEE) 802.11 standard. IEEE 802.11 denotes a set of Wireless Local Area Network (WLAN) air interface standards developed by the IEEE 802.11 committee for short-range communications (e.g., tens of meters to a few hundred meters).

The new 802.11 VHT (Very High Throughput) is a new standard, which operates in MIMO mode. MIMO technology may be used by a transmitter to communicate with several receivers using Spatial-Division Multiple Access (SDMA). SDMA is a multiple access scheme which enables multiple streams transmitted to different receivers at the same time to share the same frequency spectrum. Within any given stream, there are data packets that contain both data and preamble. Designing efficient preambles are needed to handle the new technology.

SUMMARY

In one aspect of the disclosure, an apparatus generally includes at least one processor configured to generate a plurality of spatial streams, wherein each of the spatial streams comprises a plurality of symbols and distribute at least a portion of a training sequence across a first symbol in a first one of the spatial streams and a second symbol in a second one of the spatial streams; and a memory coupled with the at least one processor.

In one aspect of the disclosure, a method for communications comprises generating a plurality of spatial streams wherein each of the spatial streams comprises a plurality of symbols. The method further comprises distributing at least a portion of a training sequence across a first symbol in a first one of the spatial streams and a second symbol in a second one of the spatial streams.

In one aspect of the disclosure, an apparatus for communications comprises means for generating a plurality of spatial streams, wherein each of the spatial streams comprises a plurality of symbols. The apparatus further comprises means for distributing at least a portion of a training sequence across a first symbol in a first one of the spatial streams and a second symbol in a second one of the spatial streams.

In one aspect of the disclosure, a computer-program product for wireless communication comprises a machine-readable medium encoded with instructions executable to generate a plurality of spatial streams, wherein each of the spatial streams comprises a plurality of symbols. The machine-readable medium is further encoded with instructions executable to distribute at least a portion of a training sequence across a first symbol in a first one of the spatial streams and a second symbol in a second one of the spatial streams.

In one aspect of the disclosure, an access terminal generally includes a processing system configured to receive a plurality of spatial streams, wherein each of the spatial streams comprises a plurality of symbols, and wherein at least a portion of a training sequence is distributed across a first symbol in a first one of the spatial streams and a second symbol in a second one of the spatial streams; and a user interface supported by the processing system.

In one aspect of the disclosure, an apparatus for wireless communications generally includes at least one processor configured to generate a preamble to be transmitted to a plurality of stations, the preamble comprising a sequence of symbols transmit a first part of the preamble in a non-beamformed fashion, and transmit a second part of the preamble using beamforming; and a memory coupled with the at least one processor.

In one aspect of the disclosure, a method for wireless communications generally includes generating a preamble to be transmitted to a plurality of stations, the preamble comprising a sequence of symbols, transmitting a first part of the preamble in a non-beamformed fashion, and transmitting a second part of the preamble using beamforming.

In one aspect of the disclosure, an apparatus for wireless communications generally includes means for generating a preamble to be transmitted to a plurality of stations, the preamble comprising a sequence of symbols, means for transmitting a first part of the preamble in a non-beamformed fashion, and means for transmitting a second part of the preamble using beamforming.

In one aspect of the disclosure, a computer-program product for wireless communication generally includes a machine-readable medium encoded with instructions executable to generate a preamble to be transmitted to a plurality of stations, the preamble comprising a sequence of symbols, transmit a first part of the preamble in a non-beamformed fashion, and transmit a second part of the preamble using beamforming.

In one aspect of the disclosure, an access point generally includes a wireless network adapter configured to support a backhaul connection for a peer node to a network, a processing system configured to generate a preamble to be transmitted to a plurality of stations, the preamble comprising a sequence of symbols, transmit a first part of the preamble in a non-beamformed fashion, and transmit a second part of the preamble using beamforming.

In one aspect of the disclosure, an access terminal generally includes a processing system configured to receive a preamble transmitted to a plurality of access terminals, the preamble comprising a sequence of symbols, wherein a first part of the preamble is transmitted in a non-beamformed fashion and a second part of the preamble is transmitted using beamforming and a user interface supported by the processing system.

BRIEF DESCRIPTION OF THE DRAWINGS

These and other sample aspects of the invention will be described in the detailed description that follows, and in the accompanying drawings, wherein:

FIG. 6 is a diagram depicting an exemplary VHT-only-Greenfield preamble;

FIG. 8 is a diagram depicting exemplary shortened channel training for four spatial streams;

FIG. 9 is a diagram depicting exemplary channel training for eight spatial streams;

FIG. 10 is a diagram depicting exemplary alternative channel training for eight spatial streams;

FIG. 11 is a diagram depicting an exemplary VHT-only-Greenfield preamble with extended HT-LTF;

FIG. 12 is a diagram depicting exemplary channel training for sixteen spatial streams;

FIG. 13 is a diagram depicting an exemplary VHT Greenfield preamble with different STF and LTF;

FIG. 17 is a diagram depicting an exemplary VHT Mixed-Mode frame format for open loop MIMO;

FIG. 25 is a diagram depicting an exemplary alternative VHT Mixed-Mode frame format;

FIG. 26 is a diagram depicting an exemplary alternative VHT Greenfield frame format for SDMA with MMSE-ES;

FIG. 31 is a diagram depicting exemplary Walsh encoded channel training for SDMA.

Figure 1:
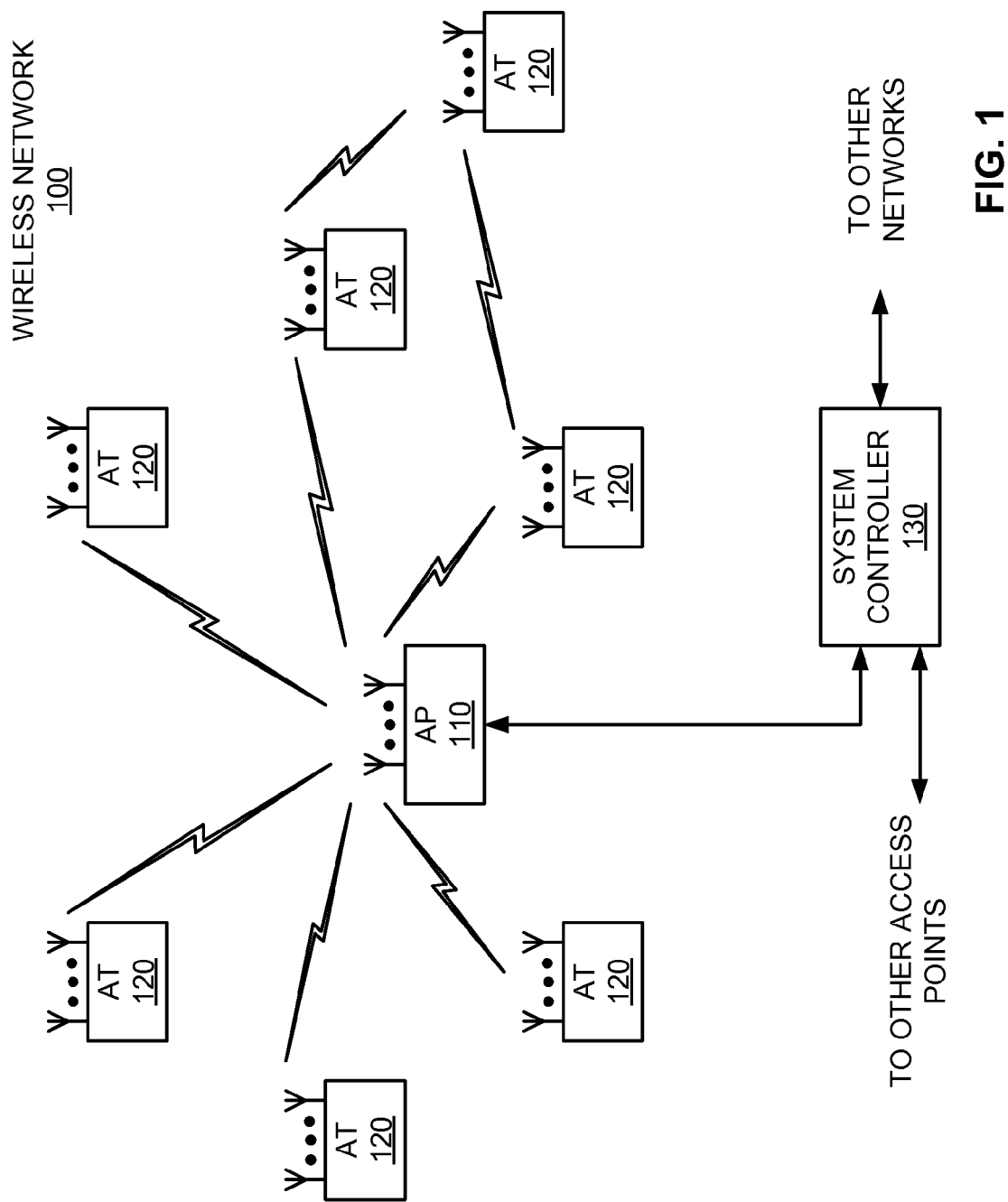
FIG. 1 is a diagram of a wireless communications network.

In accordance with common practice, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the invention are described more fully hereinafter with reference to the accompanying drawings. This invention may, however, be embodied in many different forms and should not be construed as limited to any specific structure or function presented throughout this disclosure. Rather, these aspects are provided so that this disclosure will be thorough and complete, and will fully convey the scope of the invention to those skilled in the art. Based on the teachings herein, one skilled in the art should appreciate that the scope of the invention is intended to cover any aspect of the invention disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect of the invention disclosed herein may be embodied by one or more elements of a claim.

Several aspects of a wireless network will now be presented with reference to FIG. 1. The wireless network 100 is shown with several wireless nodes, generally designated as nodes 110 and 120. Each wireless node is capable of receiving and/or transmitting. In the detailed description that follows, the term "access point" is used to designate a transmitting node and the term "access terminal" is used to designate a receiving node for downlink communications, whereas the term "access point" is used to designate a receiving node and the term "access terminal" is used to designate a transmitting node for uplink communications. However, those skilled in the art will readily understand that other terminology or nomenclature may be used for an access point and/or access terminal. By way of example, an access point may be referred to as a base station, a base transceiver station, a station, a terminal, a node, an access terminal acting as an access point, or some other suitable terminology. An access terminal may be referred to as a user terminal, a mobile station, a subscriber station, a station, a wireless device, a terminal, a node or some other suitable terminology. The various concepts described throughout this disclosure are intended to apply to all suitable wireless nodes regardless of their specific nomenclature.

The wireless network 100 may support any number of access points distributed throughout a geographic region to provide coverage for access terminals 120. A system controller 130 may be used to provide coordination and control of the access points, as well as access to other networks (e.g., Internet) for the access terminals 120. For simplicity, one access point 110 is shown. An access point is generally a fixed terminal that provides backhaul services to access terminals in the geographic region of coverage; however, the access point may be mobile in some applications. An access terminal, which may be fixed or mobile, utilizes the backhaul services of an access point or engages in peer-to-peer communications with other access terminals. Examples of access terminals include a telephone (e.g., cellular telephone), a laptop computer, a desktop computer, a Personal Digital Assistant (PDA), a digital audio player (e.g., MP3 player), a camera, a game console or any other suitable wireless node.

The wireless network 100 may support MIMO technology. Using MIMO technology, an access point 110 may communicate with multiple access terminals 120 simultaneously using SDMA. As explained in the background section of this disclosure, SDMA is a multiple access scheme which enables multiple streams transmitted to different receivers at the same time to share the same frequency channel and, as a result, provide higher user capacity. This is achieved by spatially precoding each data stream and then transmitting each spatially precoded stream through a different transmit antenna on the downlink. The spatially precoded data streams arrive at the access terminals with different spatial signatures, which enables each access terminal 120 to recover the data stream destined for that access terminal 120. On the uplink, each access terminal 120 transmits a spatially precoded data stream, which enables the access point 110 to identify the source of each spatially precoded data stream.

One or more access terminals 120 may be equipped with multiple antennas to enable certain functionality. With this configuration, multiple antennas at the access point 110 may be used to communicate with a multiple antenna access point to improve data throughput without additional bandwidth or transmit power. This may be achieved by splitting a high data rate signal at the transmitter into multiple lower rate data streams with different spatial signatures, thus enabling the receiver to separate these streams into multiple channels and properly combine the streams to recover the high rate data signal.

While portions of the following disclosure will describe access terminals that also support MIMO technology, the access point 110 may also be configured to support access terminals that do not support MIMO technology. This approach may allow older versions of access terminals (i.e., "legacy" terminals) to remain deployed in a wireless network, extending their useful lifetime, while allowing newer MIMO access terminals to be introduced as appropriate.

In the detailed description that follows, various aspects of the invention will be described with reference to a MIMO system supporting any suitable wireless technology, such as Orthogonal Frequency Division Multiplexing (OFDM). OFDM is a spread-spectrum technique that distributes data over a number of subcarriers spaced apart at precise frequencies. The spacing provides "orthogonality" that enables a receiver to recover the data from the subcarriers. An OFDM system may implement IEEE 802.11, or some other air interface standard.

Other suitable wireless technologies include, by way of example, Code Division Multiple Access (CDMA), Time Division Multiple Access (TDMA), or any other suitable wireless technology, or any combination of suitable wireless technologies. A CDMA system may implement with IS-2000, IS-95, IS-856, Wideband-CDMA (WCDMA), or some other suitable air interface standard. A TDMA system may implement Global System for Mobile Communications (GSM) or some other suitable air interface standard. As those skilled in the art will readily appreciate, the various aspects of this invention are not limited to any particular wireless technology and/or air interface standard.

Figure 2:
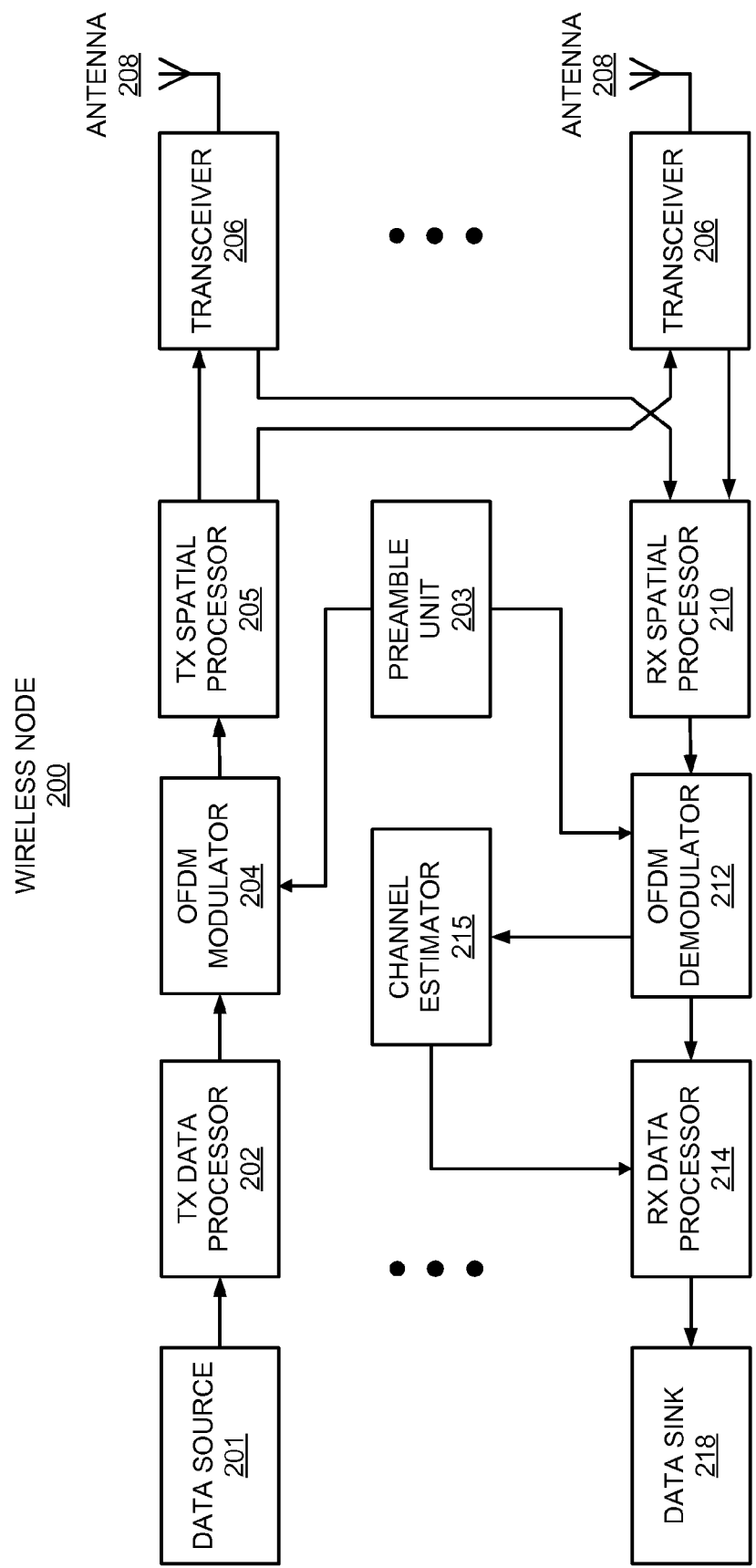
FIG. 2 is a block diagram illustrating an example of a wireless node.

FIG. 2 is a conceptual block diagram illustrating an example of a wireless node. In a transmit mode, a TX data processor 202 may be used to receive data from a data source 201 and encode (e.g., Turbo code) the data to facilitate forward error correction (FEC) at the receiving node. The encoding process results in a sequence of code symbols that may be blocked together and mapped to a signal constellation by the TX data processor 202 to produce a sequence of modulation symbols.

In wireless nodes implementing OFDM, the modulation symbols from the TX data processor 202 may be provided to an OFDM modulator 204. The OFDM modulator 204 splits the modulation symbols into a number of parallel streams and then maps each stream to a subcarrier using some modulation constellation. An Inverse Fast Fourier Transform (IFFT) is then performed on each set of subcarriers to produce time domain OFDM symbols, with each OFDM symbol having a set of subcarriers. The OFDM symbols are distributed in the payloads of multiple data packets.

In at least one configuration of a wireless node 200, a preamble is carried along with the payload in each data packet. The preamble may be comprised of several symbols which are provided to the OFDM modulator 204 by a preamble unit 203. The OFDM modulator 204 splits the preamble symbols into a number of parallel streams, and then maps each stream to a subcarrier using some modulation constellation. An IFFT is then performed on each set of subcarriers to produce one or more time domain OFDM symbols which constitutes the preamble. The preamble is then appended to payload carried by each data packet before providing the data packets to a TX spatial processor 205.

A TX spatial processor 205 performs spatial processing on the data packets. This may be accomplished by spatially precoding the data packets into a number of spatially precoded streams and then providing each spatially precoded stream to a different antenna 208 via a transceiver 206. Each transceiver 206 modulates an RF carrier with a respective precoded stream for transmission over the wireless channel.

In a receive mode, each transceiver 206 receives a signal through its respective antenna 208. Each transceiver 206 may be used to recover the information modulated onto an RF carrier and provide the information to a RX spatial processor 210.

The RX spatial processor 210 performs spatial processing on the information to recover data packets carried on any spatial streams destined for the wireless node 200. The spatial processing may be performed in accordance with Channel Correlation Matrix Inversion (CCMI), Minimum Mean Square Error (MMSE), Soft Interference Cancellation (SIC), or some other suitable technique.

The preamble unit 203 will use the preamble in each data packet to provide synchronization information to the OFDM demodulator 212. The OFDM demodulator 212 recovers the data carried on each subcarrier in the OFDM symbols in the payload of the data packet and multiplexes the data into a stream of modulation symbols. The OFDM demodulator 212 converts the stream from time-domain to the frequency domain using a Fast Fourier Transform (PET). The frequency domain signal comprises a separate stream for each subcarrier.

The channel estimator 215 receives the streams from the OFDM demodulator 212 and estimates the channel response. As part of the preamble there may be a set of pilot signals. Each pilot signal will be generally shifted in phase due to the transmission through the wireless channel. The MMSE estimates of the phase shifted pilot signals are computed and the MMSE estimates are used to estimate phase errors and consequently the channel response. The channel response is provided to the RX data processor 214.

The RX data processor 214 is used to translate the modulation symbols back to the correct point in the signal constellation. Because of noise and other disturbances in the wireless channel, the modulation symbols may not correspond to an exact location of a point in the original signal constellation. Using the channel response, the RX data processor 214 detects which modulation symbol was most likely transmitted by finding the smallest distance between the received point and the location of a valid symbol in the signal constellation. These soft decisions may be used, in the case of Turbo codes, for example, to compute a Log-Likelihood Ratio (LLR) of the code symbols associated with the given modulation symbols. The RX data processor 214 then uses the sequence of code symbol LLRs and the phase error estimates in order to decode the data that was originally transmitted before providing the data to a data sink 218.

A preamble within each data packet includes a training sequence. A training sequence contains a number of modulated symbols. A training sequence may comprise a Short Training Field (STF) and/or a Long Training Field (LTF). The preamble unit 203 together with the OFDM modulator 204 creates preambles according to the following mechanisms. The preambles are generated by distributing at least one symbol containing information indicating a length of data and a modulation scheme. Such information may be different for at least two of the data packets. The preamble unit 203 is further configured to distribute at least a portion of a training sequence or the STF or LTF, across a first symbol in a first one of the data packets and across a second symbol in a second one of the data packets. On the receive side, the preamble unit 203 is used to aid the OFDM demodulator 212 in decoding the data packets. The following is description of additional details about the operational steps taken by the preamble unit 203 on the transmit side.

The preambles may also be generated by a distribution of a further portion of the training sequence into a third symbol in a third one of the data packets, or into another symbol in the first one of the data packets that temporally follows the first symbol, or into another symbol on a third one of the data packets that temporally follows the first symbol. Also, the portion of the training sequence in the first symbol may be distributed into a fourth symbol in the first one of the spatial streams that temporally follows the third symbol.

Furthermore, when each of the first and second symbols has multiple subcarriers, then the training sequences are distributed across different subcarriers in the first and second symbols. The portion of the training sequence in the first symbol may be cyclically delayed.

When the first one of the symbols includes a number of subcarriers carrying a signal, the signal carried by the subcarriers may be multiplied by the portion of the training sequence in the first symbol. Or when the first symbol includes multiple in-band and out-of-band subcarriers, then the portion of the training sequence in the first symbol is distributed across the in-band subcarriers, and the out-of-bound subcarriers are attenuated.

In generating the preambles, at least one of the symbols, may be modulated with a spoof modulation scheme. Furthermore, one of the symbols in the first one of the spatial streams may be modulated with a first modulation scheme, and another one of the symbols in the first one of the spatial streams may be modulated with a second modulation scheme that is different from the first modulation scheme.

The following figures illustrate a number of exemplary preambles that may be constructed. The new exemplary preambles start with existing 11n (802.11 version n) preambles and include High Throughput-Signals (HT-SIG) using spoofed rate and length field. Extra HT-SIG fields are used for signaling new modes, and modified High Throughput-Long Training Fields (HT-LTF) are used for channel estimation of more tones and/or more spatial streams.

In the context of having an extra HT-SIG for Greenfield (GF), a 3rd HT-SIG symbol is inserted after existing HT-SIG symbols. A Binary Phase Shift Keying (BPSK) spoof rate is used with one spatial stream in 11n HT-SIG. Existing rotated-BPSK mechanism is used to detect the presence of the 3rd HT-SIG. A HT-LTF may use more subcarriers than 11n in a 40 MHz 11n subchannel. To avoid legacy problems, the first HT-LTF uses 11n subcarriers. This would lead to having 114 subcarriers in each 40 MHz subchannel.

In the context of extra HT-SIG, for Mixed Mode (MM), a 3rd HT-SIG is inserted after first HT-LTF. The 3rd HT-SIG may not be inserted after existing HT-SIG because a gain step is performed at that point. Furthermore, a BPSK spoof rate is used with 1 spatial stream in 11n HT-SIG, and existing rotated-BPSK mechanism is used to detect the presence of the 3rd HT-SIG.

In the context of having an extra HT-SIG option, one extra symbol using rotated BPSK may be employed if 24 extra signaling bits are enough. Two extra symbols using rotated BPSK can result in more overhead. One extra symbol using Quadrature Phase Shift Keying (QPSK) may result in a Signal-to-Noise Ratio (SNR) penalty in detecting QPSK versus rotated BPSK. The pilots of the extra HT-SIG3 can be inverted.

Figure 3:
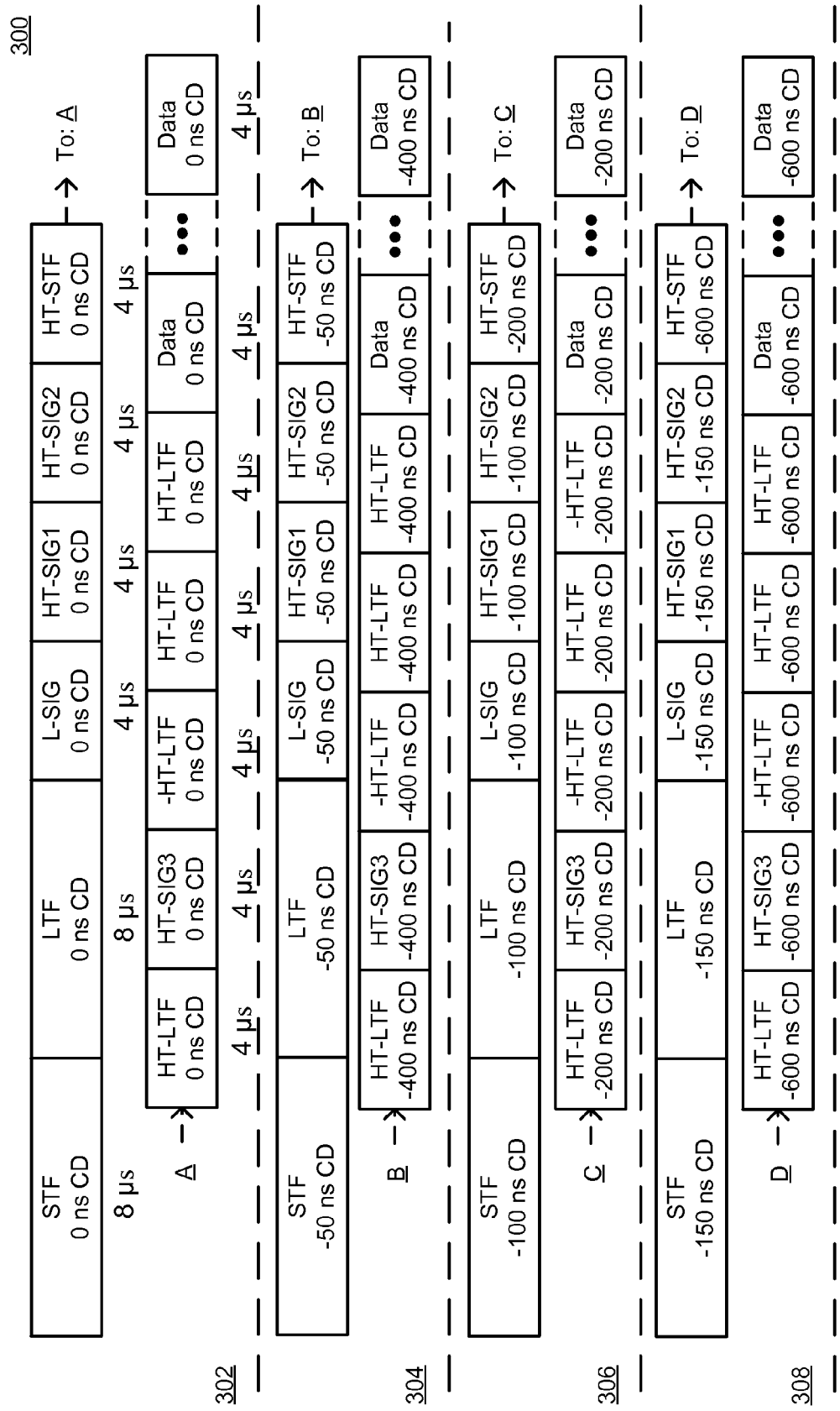
FIG. 3 is a diagram depicting an exemplary Mixed-Mode preamble with 3rd HT-SIG symbol.

FIG. 3 is a diagram depicting a set of example Mixed-Mode preambles 300 with a 3rd HT-SIG symbol, which includes Mixed-Mode preambles 302, 304, 306, and 308. The 3rd HT-SIG has a different sign and cyclic delay than HT-SIG1 and HT-SIG2 to match the sign and cyclic delay of HT-LTF. All symbols up to the High Throughput-Short Training Field (HT-STF) are 11n 40 MHz copies in two 40 MHz channels, possibly with a 90 degrees phase rotation. Symbols after HT-STF may use tone filling to have more subcarriers than two 11n 40 MHz channels. The set of example Mixed-Mode preambles 300 shown in FIG. 3 is for four antennas, this can be extended to eight by using different cyclic delays on the other four antennas.

Figure 4:
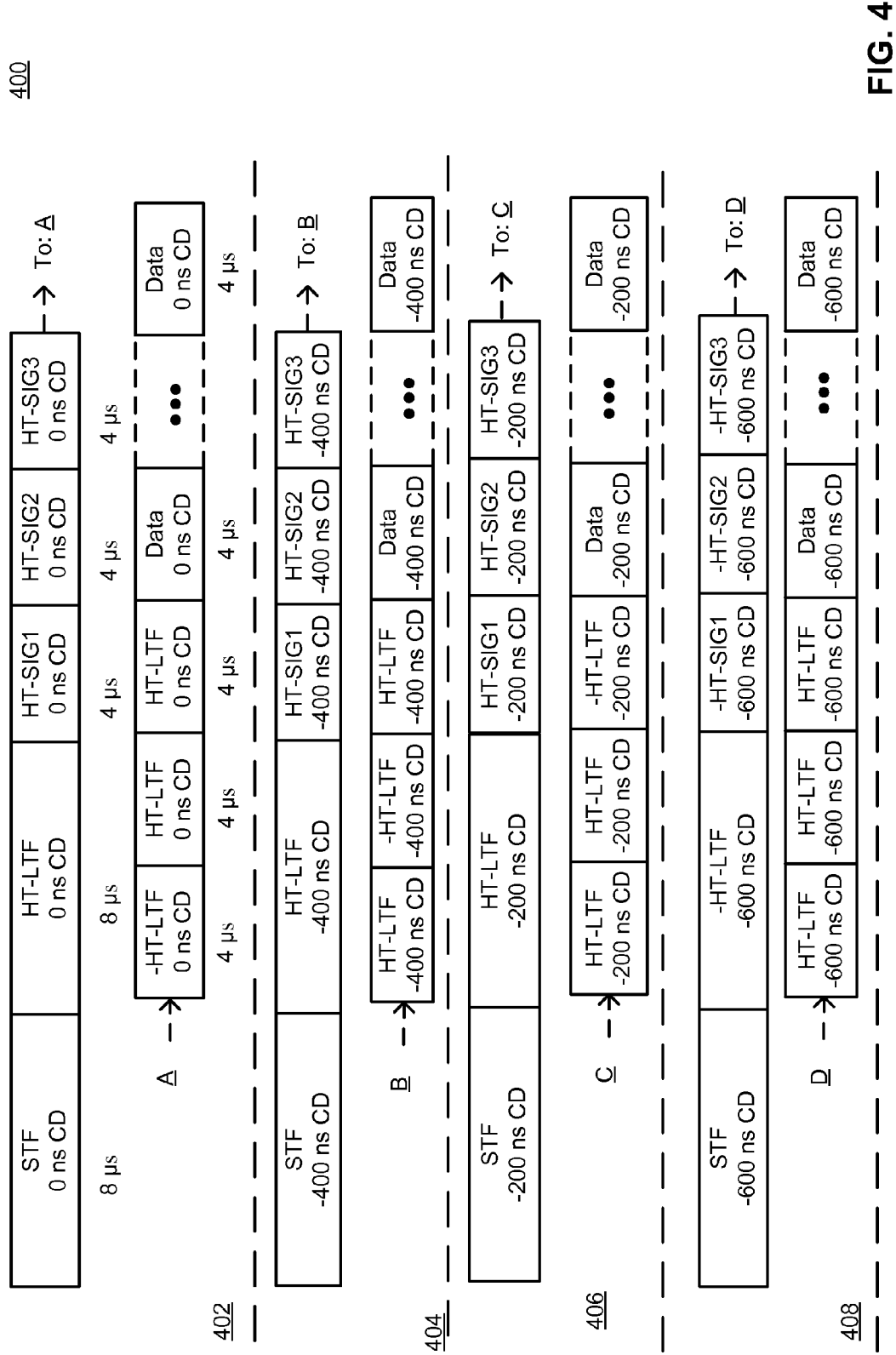
FIG. 4 is a diagram depicting an exemplary Greenfield preamble with 3rd HT-SIG symbol.

FIG. 4 is a diagram depicting a set of example Greenfield preambles 400 with 3rd HT-SIG symbol, which includes Greenfield preambles 402, 404, 406, and 408. Legacy 11n devices have to defer based on HT-SIG1&2 that contains a spoof length and spoof BPSK rate. BPSK check is rotated on HT-SIG3 to detect the new mode.

Figure 5:
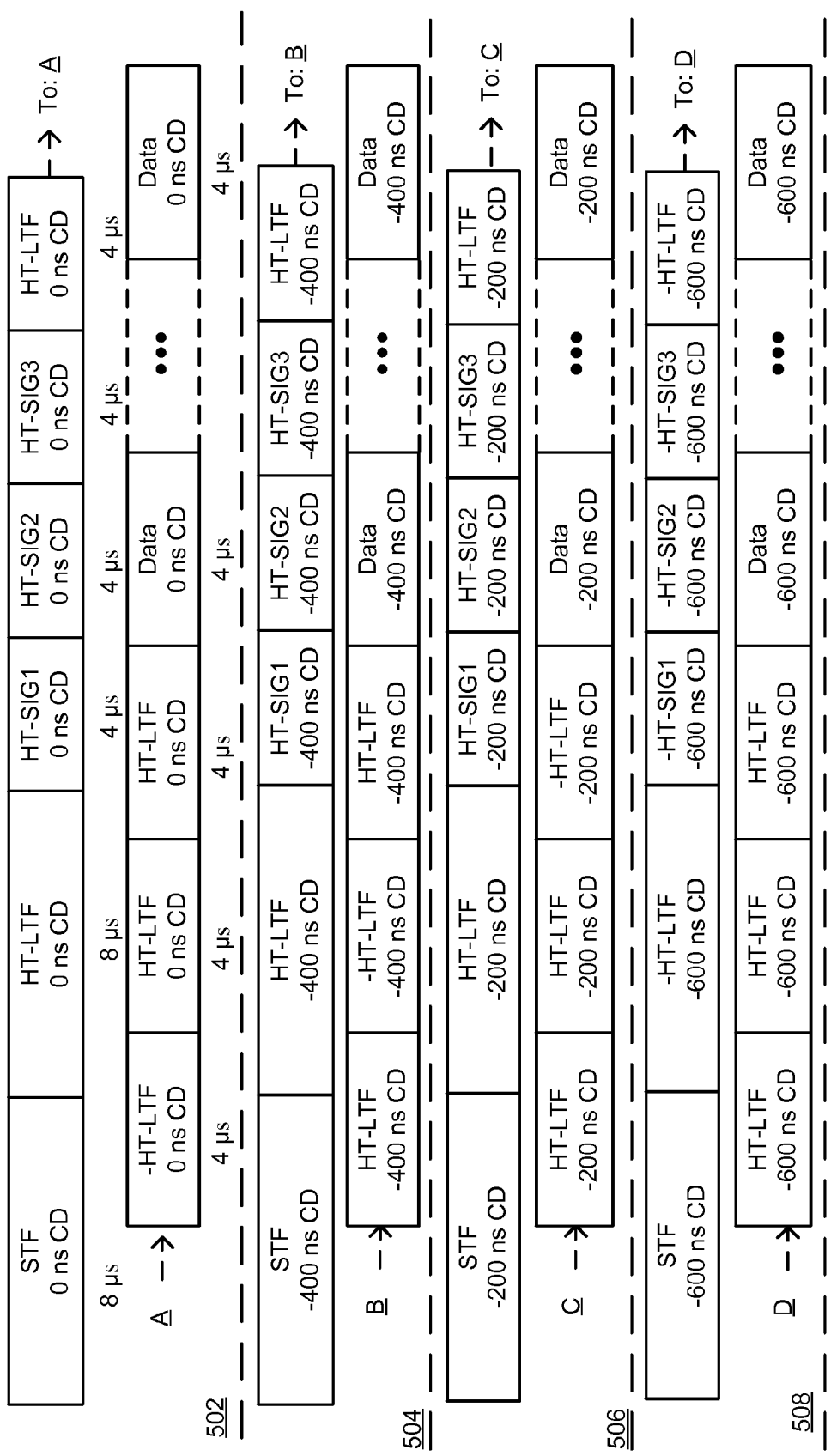
FIG. 5 is a diagram depicting an exemplary preamble with an extra HT-LTF.

FIG. 5 is a diagram depicting a set of example preambles 500 with an extra HT-LTF, which includes preambles 502, 504, 506, and 508. The preambles contained in the set of preambles 500 of FIG. 5 are similar to the set of example Greenfield preambles 400, but with an extra HT-LTF. As such, there is no need to do tone filling in the first HT-LTF.

FIG. 6 is a diagram depicting a set of example VHT-only-Greenfield preambles 600, which includes VHT-only-Greenfield preambles 602, 604, 606, and 608. The set of example VHT-only-Greenfield preambles 600 shown in FIG. 6 is used for VHT networks or within a transmit operation when the medium is reserved for some time. Detection of this preamble is done by a QPSK detect on HT-SIG3 or by using inverted pilots in HT-SIG3. This preamble is for 4 spatial streams, it can be extended to 8 or more by using different cyclic delays and by using different HT-LTFs.

Figure 7:
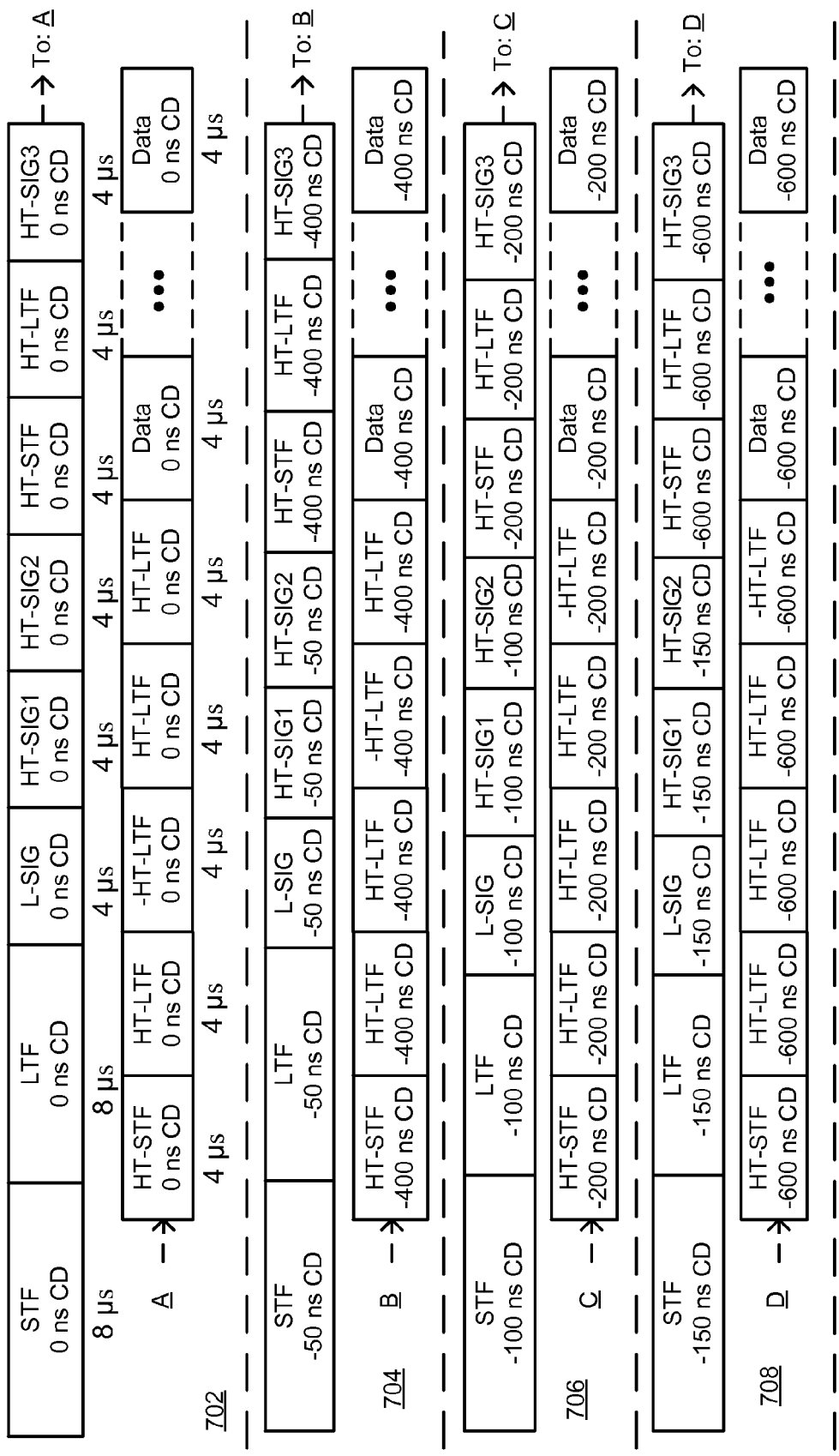
FIG. 7 is a diagram depicting an exemplary alternative Mixed-Mode preamble with extra HT-STF.

FIG. 7 is a diagram depicting a set of example alternative Mixed-Mode preambles 700 with extra HT-STF, which includes alternative Mixed-Mode preambles 702, 704, 706, and 708. The set of example alternative Mixed-Mode preambles 700 shown in FIG. 7 may be used in combination with beamforming, where beamforming can start after HT-SIG3 such that there are no hidden node problems up to HT-SIG3. There may be an additional 8 microseconds in the preamble—one extra HT-STF and one extra HT-LTF. This alternative preamble may not be necessary if all devices are required to defer for the length indicated by HT-SIG1&2.

For more than 4 spatial streams, in the 11n extension, more HT-LTF symbols, (e.g., 8 symbols with a length 8 Walsh codes for 8 spatial streams) may be used. Several shorter alternatives exist for the HT-LTF part of the preamble. For example, one may use tone interpolation to distinguish between spatial streams, and another may use large cyclic delay (CD) or cyclic delay diversity (CDD) values to distinguish between spatial streams. Both methods may require channel interpolation at the receiver.

FIG. 8 is a diagram depicting a set of example shortened channel training sequences 800 for four spatial streams, which includes shortened channel training sequences 802, 804, 806, and 808. A 1600 ns CD in combination with a Walsh code for separating 2 pairs of spatial streams, may be used. Channel truncation and interpolation may be needed in the receiver to do channel training.

FIG. 9 is a diagram depicting a set of example channel training sequences 900 for eight spatial streams, which includes shortened channel training sequences 902, 904, 906, 908, 910, 912, 914, and 916. Similar to the example shown for FIG. 8, a 1600 ns CD in combination with a Walsh code for separating 2 pairs of spatial streams may also be used in this case. Channel truncation and interpolation may also be needed in a receiver to perform channel training.

FIG. 10 is a diagram depicting a set of example alternative channel training sequences 1000 for eight spatial streams, which includes shortened channel training sequences 1002, 1004, 1006, 1008, 1010, 1012, 1014, and 1016. Referring to FIG. 10, impulse responses for each spatial stream may have to be limited to 800 ns in order to separate 4 spatial streams after the adding and subtracting of both columns.

It may be desirable to add some constant CD (e.g., 200 ns) to the bottom 4 rows in the preambles shown in FIGS. 9 and 10 in order to avoid any undesired beamforming. Having an 8 spatial stream Greenfield preamble with HT-SIG3 could be 36 microseconds, which is the same length as the current 4 spatial stream 802.11n Greenfield preamble.

Current 11n HT-LTF may be sensitive to phase noise and frequency errors. One way to estimate common phase errors during the channel training interval would be to use a subset of pilot tones that do not change relative phase per spatial stream throughout the entire channel training interval.

Alternatively, one may increase the guard time of the channel training symbols. The 11n system uses a guard time of 800 ns which is required to deal with delay spread. By increasing this guard time to 1600 ns or even more, a significant amount of samples in every HT-LTF can be used to estimate a frequency error per symbol. A 2800 ns guard interval would give an HT-LTF symbol duration of 6 microseconds with 2 microseconds available for frequency estimation. The frequency estimation can be done by comparing the phase of the samples in the interval 800 ns to 2800 ns to the samples in the interval 4000 ns to 6000 ns.

FIG. 11 is a diagram depicting a set of example VHT-only-Greenfield preambles 1100 with extended HT-LTF, which includes VHT-only-Greenfield preambles 1102, 1104, 1106, 1108, 1110, 1112, 1114, and 1116. More specifically, FIG. 11 shows a 38 microseconds preamble for 8 spatial streams in an 80 MHz channel (11n Greenfield preamble is 36 microseconds for 4 spatial streams). The HT-LTF could be extended to 8 microseconds, making the preamble 44 microseconds.

Existing Nss-spatial stream channel training HN, such as the described 8-spatial stream training, can be used to make a new training pattern to double the number of spatial streams by the following equation.

$$H_{2N} = \begin{bmatrix} H_N & H_N \\ H_N & -H_N \end{bmatrix}$$

With this extension, a 16-spatial stream preamble can be made that is as long as the 8-spatial stream preambles but with double the number of HT-LTF symbols.

FIG. 12 is a diagram depicting a set of example channel training sequence 1200 for sixteen spatial streams, which includes channel training sequences 1202, 1204, 1206, 1208, 1210, 1212, 1214, 1216, 1218, 1220, 1222, 1224, 1226, 1228, 1230, and 1232.

Regarding VHT Signal Field for SDMA downlink, a single spatial stream followed by a SDMA downlink beamforming matrix may be used. For example, for a 2-space-time-stream client, one may first generate two VHT-SIG copies with a CDD of −400 ns. Then a beamforming matrix can be applied to obtain, for instance, 8 TX (transmit) signals (in case of an AP with 8 antennas).

Regarding VHT-SIG for uplink, clients may transmit a preamble with a number of spatial streams being equal to the max number of spatial streams that AP can handle. Alternative, the number of spatial streams may be greater than the total number of all uplink streams. AP can do MIMO detection on different VHT-SIGs after the HT-LTF channel estimation.

For SDMA uplink, the preambles described above can be used, however each user would need to transmit on a different part of the available spatial streams. For instance, if there are 3 users and 16 spatial streams, user 1 transmits using spatial streams 1-8, user two transmits using streams 9-14, and user 3 transmits using streams 15-16.

There may be an issue with the VHT-SIG that may need to be different per user unless the AP already knows in advance what modulation and packet length each user has). One possibility would be to have a VHT-SIG after last VHT-LTF. Regarding VHT-SIG in SDMA uplink, it is assumed that AP knows in advance how many streams each client transmits. This can be fulfilled, for example, by some scheduled mechanism. After the last VHT-LTF, each client may transmit a VHT-SIG copy with a different CDD on each spatial stream.

Previous figures showed short training fields (STFs) consisting of 802.11n STFs with different CDD values per transmitter. However, alternative STF signals are possible with better Automatic Gain Control (AGC) setting. Also there are alternative LTF symbols.

FIG. 13 is a diagram depicting a set of example VHT Greenfield preambles 1300 with different STF and LTF, which includes VHT Greenfield preambles 1302, 1304, 1306, 1308, 1310, 1312, 1314, and 1316. Referring to FIG. 13, each preamble in the set of VHT Greenfield preambles 1300 can be extended to 16 spatial streams by adding 8 different STF<F and by using an 8×8 Walsh-Hadamard encoding on groups of two LTF symbols. The scheme shown in FIG. 13 uses a 4×4 Walsh-Hadamard encoding on groups of two LTF symbols.

The following are the 1600 ns cyclic delayed pairs: {LTF1, LTF2}, {LTF3,LTF4}, {LTF5,LTF6}, {LTF7,LTF8}, such that LTF1=LTF2 multiplied by a {1,−1,1,−1, . . . } pattern in the frequency domain. The VHT-SIG subcarriers for Transmitter m are multiplied by their corresponding LTF m subcarrier values. This makes it possible to decode VHT-SIG before receiving all LTF symbols, similar to the decoding of HT-SIG in an 11n packet. The data symbols may use a cyclic delay value CDm, e.g., m*200 ns to prevent any undesired beamforming effects.

Figure 14:
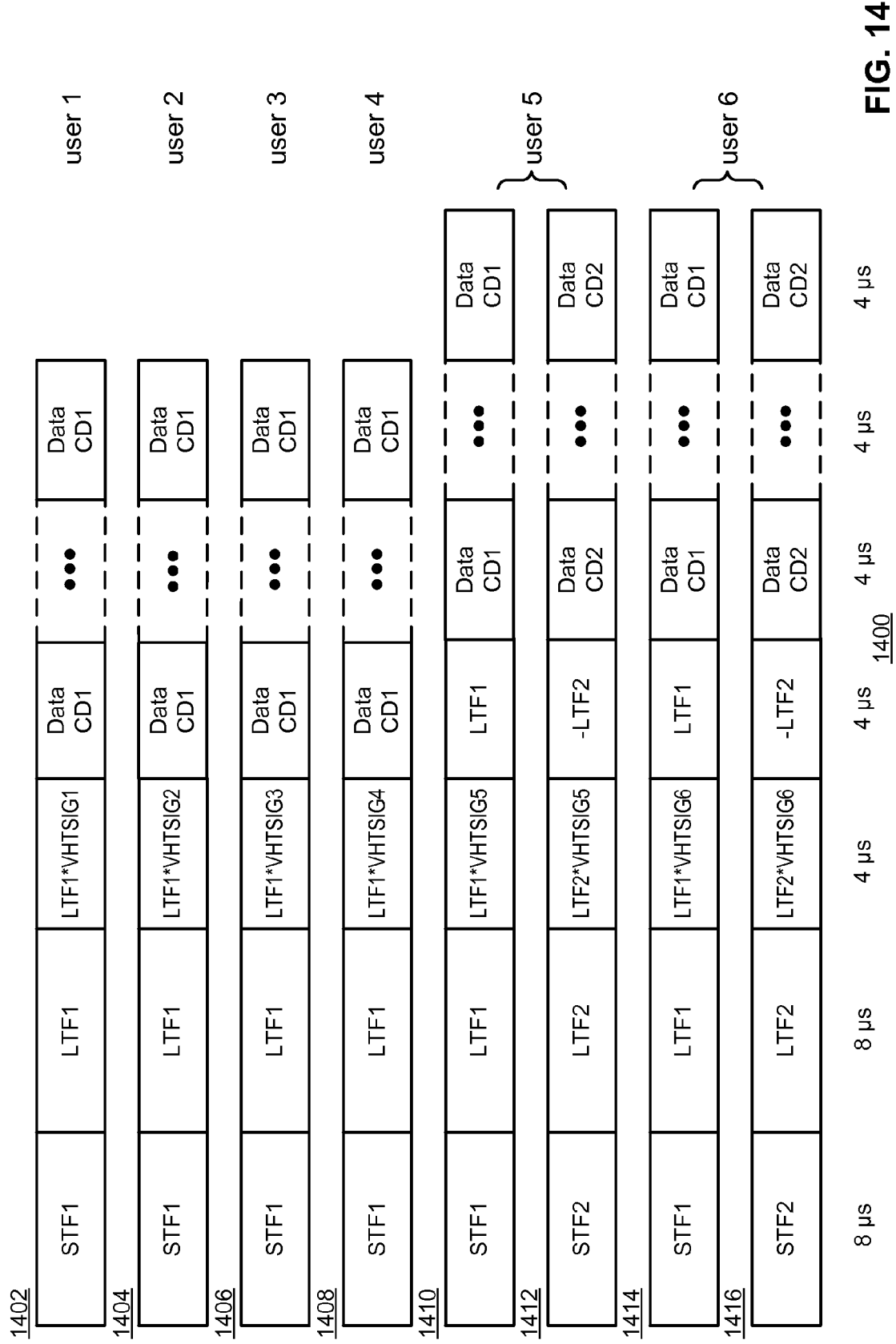
FIG. 14 is a diagram depicting an exemplary VHT Greenfield frame format.

FIG. 14 is a diagram depicting a set of example VHT Greenfield frame formats 1400, which includes VHT Greenfield frame formats 1402, 1404, 1406, 1408, 1410, 1412, 1414, and 1416. Referring to FIG. 14, each user can have 1 to 8 spatial streams, resulting in different preamble lengths per user.

Figure 15:
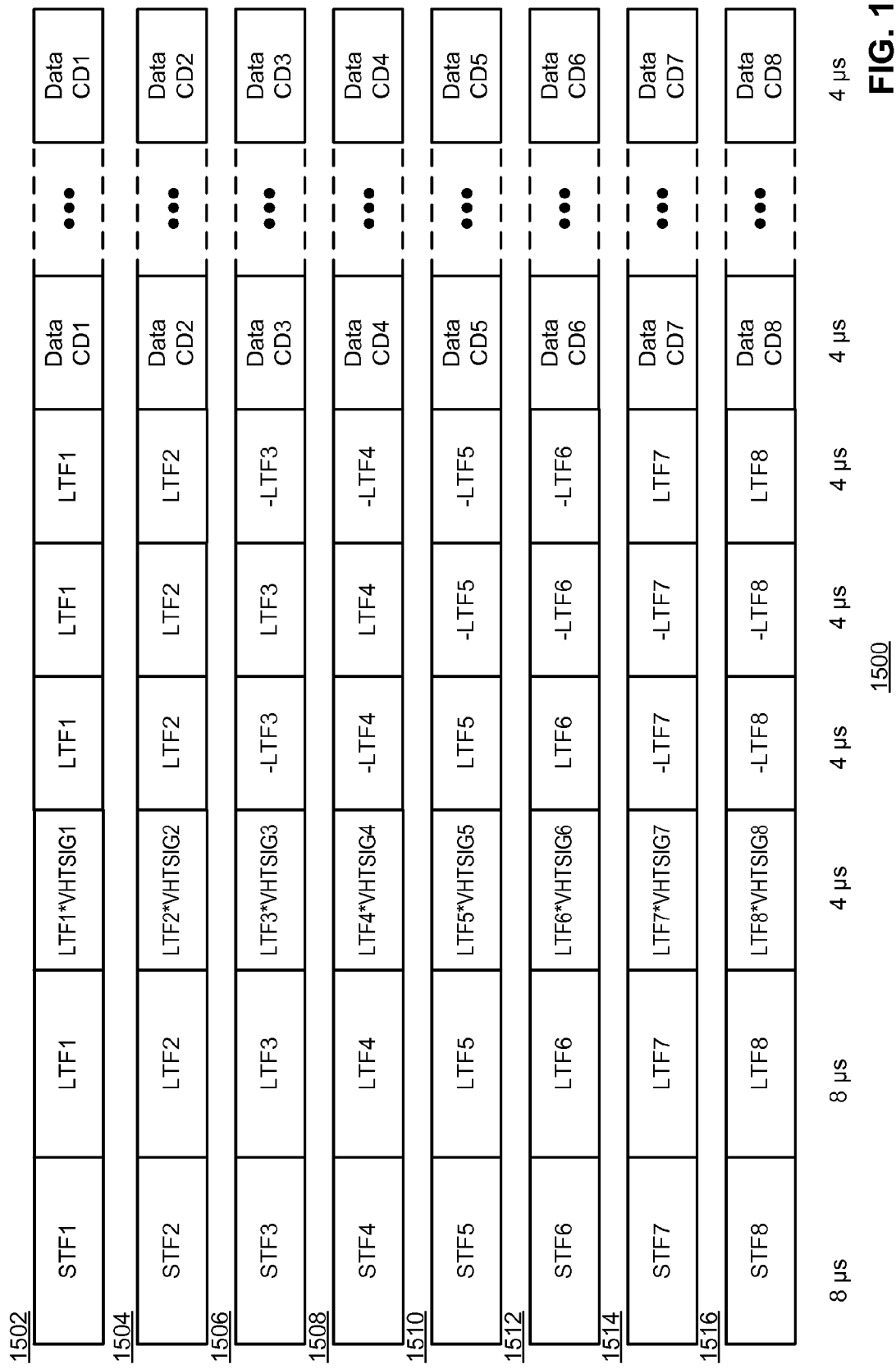
FIG. 15 is a diagram depicting an exemplary VHT Greenfield frame format for open loop MIMO.

FIG. 15 is a diagram depicting a set of example VHT Greenfield frame formats 1500 for open loop MIMO, which includes VHT Greenfield frame formats 1502, 1504, 1506, 1508, 1510, 1512, 1514, and 1516. The set of example VHT Greenfield frame formats 1500 may be used in VHT-only networks or in a transmit operation preceded by an 802.11n NAV (Net Allocation Vector) setting. Preamble length including VHT-SIG is 32 microseconds for 8 spatial streams. The format can be extended to 16 spatial streams by adding 4 more LTFs. All parts of the frame are identically precoded in case of SDMA. Content of VHT-SIG is identical on spatial streams intended for the same user. VHT-SIG subcarriers are multiplied by LTF frequency domain values, which make it possible for each user to perform a Single Input, Multiple Output (SIMO) decoding of VHT-SIG using the first received LTF for channel estimation. Same frame formats may be used for open-loop MIMO. All VHT-SIG contents are identical in this case as there is only one receiving user. A VHT-GF may be detected by QPSK detection on VHT-SIG or by detecting inverted pilots in VHT-SIG.

Figure 16:
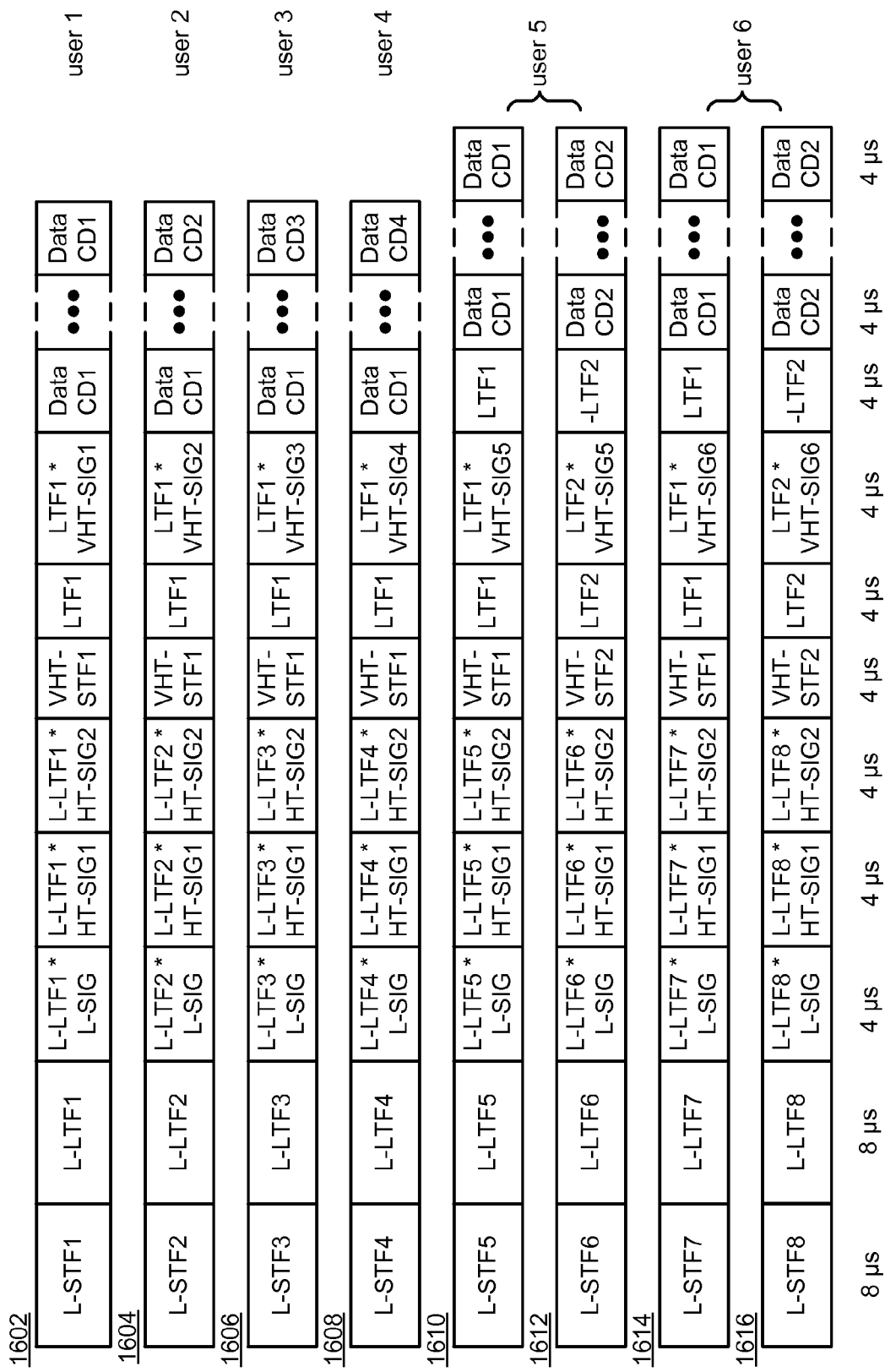
FIG. 16 is a diagram depicting an exemplary VHT Mixed-Mode frame format.

FIG. 16 is a diagram depicting a set of example Very High Throughput-Mixed-Mode (VHT-MM) frame formats 1600, which includes VHT-MM frame formats 1602, 1604, 1606, 1608, 1610, 1612, 1614, and 1616.

Figure 17:
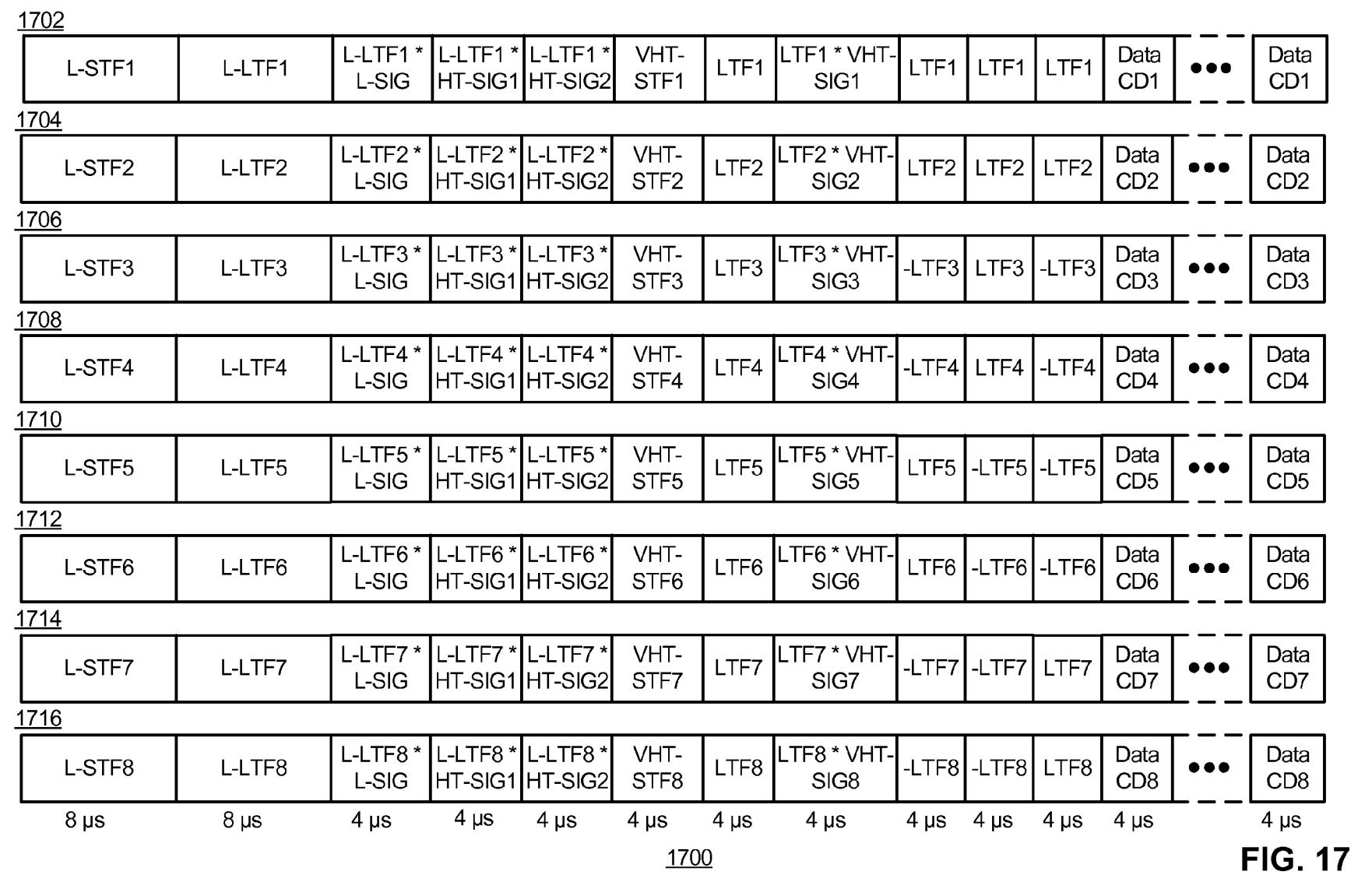

FIG. 17 is a diagram depicting a set of example VHT-MM frame formats 1700 for open loop MIMO, which includes VHT-MM frame formats 1702, 1704, 1706, 1708, 1710, 1712, 1714, and 1716.

Preamble length including VHT-SIG is 52 microseconds for 8 spatial streams. The format can be extended to 16 spatial streams by adding 4 more LTFs. The SDMA beamforming starts after HT-SIG2. Contents of VHT-SIG are identical on spatial streams intended for the same user. VHT-SIG subcarriers are multiplied by LTF frequency domain values, which makes it possible for each user to do a SIMO decoding of VHT-SIG using the first received LTF for channel estimation. The same frame format is used for open-loop MIMO. All VHT-SIG contents are identical in this case as there is only one receiving user.

VHT-MM can be detected by rotated-BPSK check on VHT-SIG, or by QPSK detection on VHT-SIG (if VHT-SIG QPSK is used to get more bits in one symbol) or by detecting inverted pilots in VHT-SIG. One may use BPSK 11n-spoof rate, such that the receiver will distinguish between the BPSK data symbol and the VHT-SIG when detecting VHT-MM. HT-SIG content is fully 11n compliant, without having to use reserved bits. VHT-SIG cannot be directly after the HT-SIG because of the AGC gain setting that is done immediately after HT-SIG on (V)HT-STF. Cyclic delay values are multiples of −200 ns (the same values as used in LTF when cyclic delayed LTF symbol is used).

Figure 18:
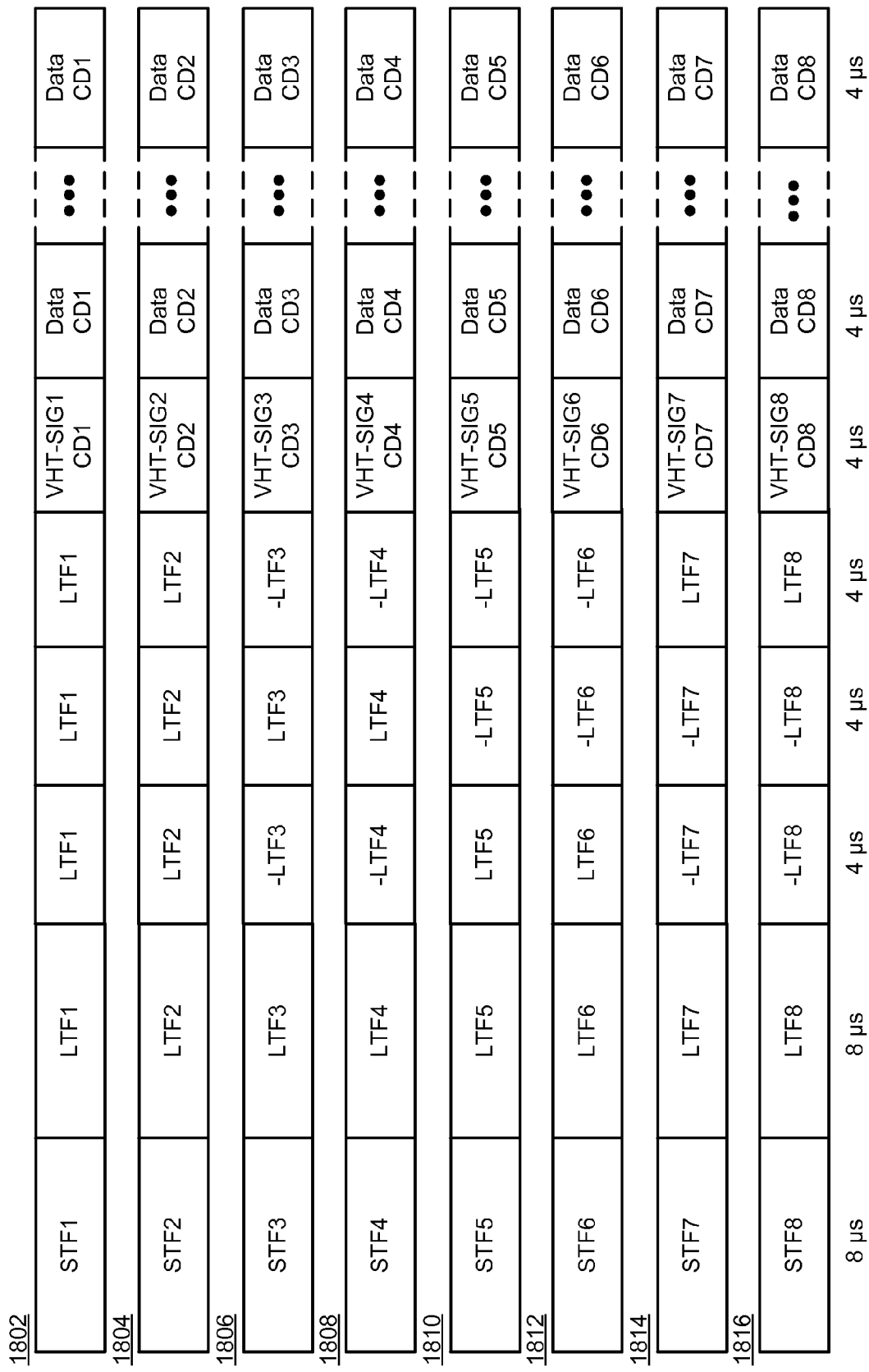
FIG. 18 is a diagram depicting an exemplary uplink frame format.

FIG. 18 is a diagram depicting a set of example uplink frame formats 1800, which includes uplink frame formats 1802, 1804, 1806, 1808, 1810, 1812, 1814, and 1816. Each uplink user uses a different subset of the available spatial streams ranging from 1-8 or 1-16. There is no mixed-mode preamble as it is assumed that there will always be an AP packet indicating the start of the uplink SDMA transmit operation (TXOP), which can include 11n NAV setting. VHT-SIG comes after all LTF symbols because the AP needs to do a MIMO detection on different VHT-SIGs per user. If a user transmits more than one spatial stream, its VHT-SIG content will be the same on all streams it transmits.

The AP has to know in advance how many spatial stream each user has. So, this information does not need to be in VHT-SIG. Uplink frame format may not be used for open-loop MIMO because one may not know in advance how many spatial streams there are. Therefore, a VHT SIG would be desirable to have before all the channel trainings.

Figure 19:
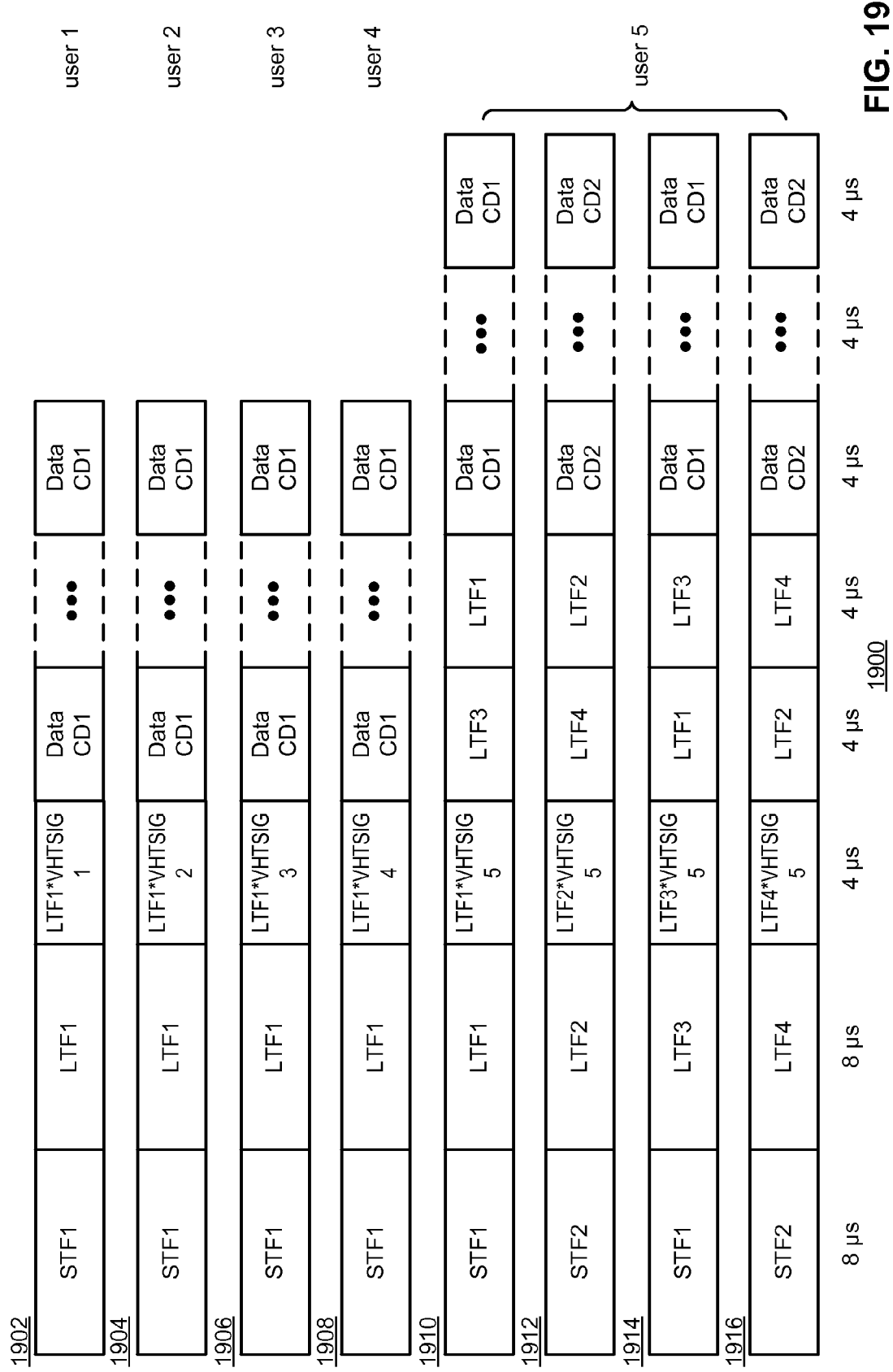
FIG. 19 is a diagram depicting an exemplary alternative VHT Greenfield frame format.

FIG. 19 is a diagram depicting a set of example alternative VHT Greenfield frame formats 1900, which includes alternative VHT Greenfield frame formats 1902, 1904, 1906, 1908, 1910, 1912, 1914, and 1916. Each user can have 1 to 8 spatial streams, resulting in different preamble lengths per user.

Figure 20:
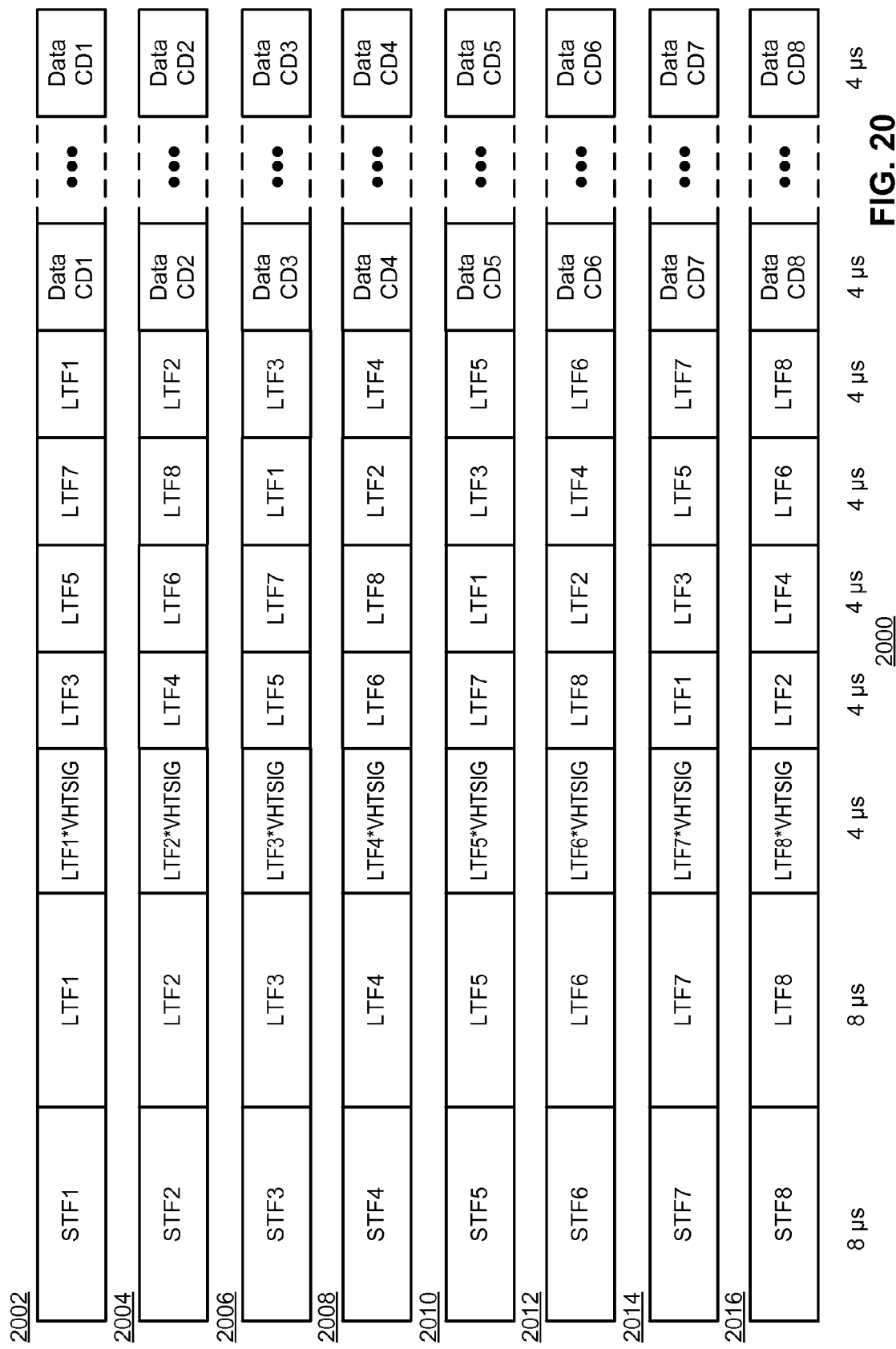
FIG. 20 is a diagram depicting an exemplary alternative VHT Greenfield frame format for open loop MIMO.

FIG. 20 is a diagram depicting a set of example alternative VHT Greenfield frame formats 2000 for open loop MIMO, which include alternative VHT Greenfield frame formats 2002, 2004, 2006, 2008, 2010, 2012, 2014, and 2016. The notation "LTF1*VHT-SIG" means an element-wise multiplication per subcarrier. Each VHT-SIG subcarrier is multiplied by the corresponding LTF subcarrier value. The LTF subcarrier value may include a phase rotation caused by a cyclic delay. The LTF symbols are tone interleaved. LTF has non-zero elements only at subcarriers. The LTF symbols may use one or more out-of-band tones to facilitate simpler and more accurate tone interpolation. Out-of-band tones are tones that are not used in data symbols. LTF out-of-band tones may be attenuated by a prescribed amount so that they would have less impact on the transmitted spectral mask.

The VHT-LTF subcarrier values are defined as:

$$\text{VHT-LTFi}(i+kNss)=Nss^{1/2} L(i+kNss), k=0, 1, \ldots, \text{floor}(Nsc/Nss), i+kNss<Nsc \quad \text{VHT-LTFi}(j)=0, j \neq i+kN_{ss}$$

where Nsc is the total number of subcarriers, Nss is the maximum number of spatial streams in the uplink (4 or 2), and L(k) is the $k^{th}$ subcarrier value of a binary long training symbol pattern, which may be the 802.11n long training symbol for cases that use the same number as subcarriers as 802.11n. As an example, for the 8 spatial stream preamble in a 20 MHz channel, VHT-LTF0 has non-zero values only at tones {0, 8, 16, . . . , 52}, while VHT-LTF1 has non-zero tones at {1, 9, 17, . . . , 53}.

Figure 21:
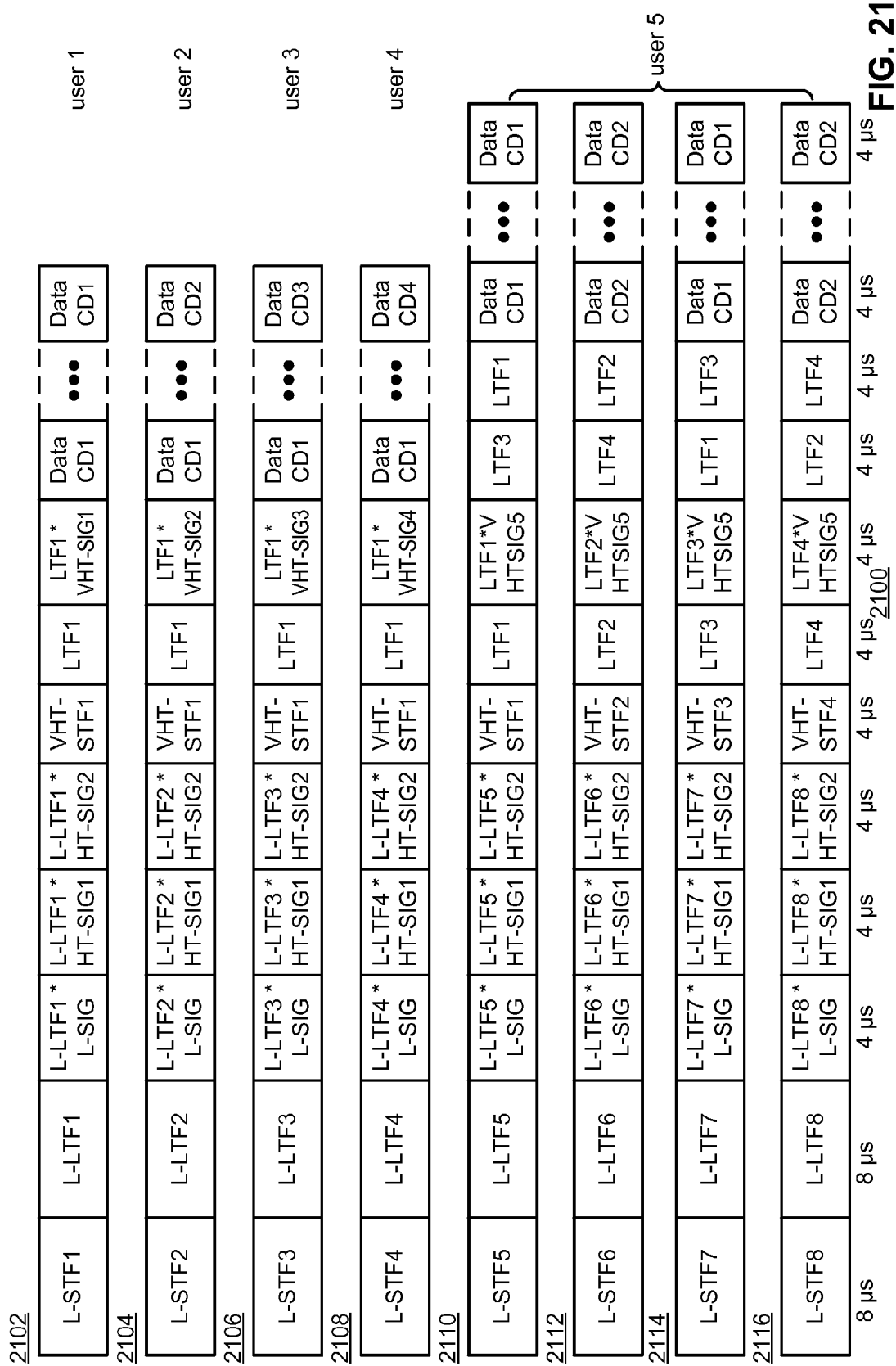
FIG. 21 is a diagram depicting an exemplary alternative VHT Mixed-Mode frame format.

FIG. 21 is a diagram depicting a set of example alternative VHT-MM frame formats 2100, which includes alternative VHT-MM frame formats 2102, 2104, 2106, 2108, 2110, 2112, 2114, and 2116.

Figure 22:
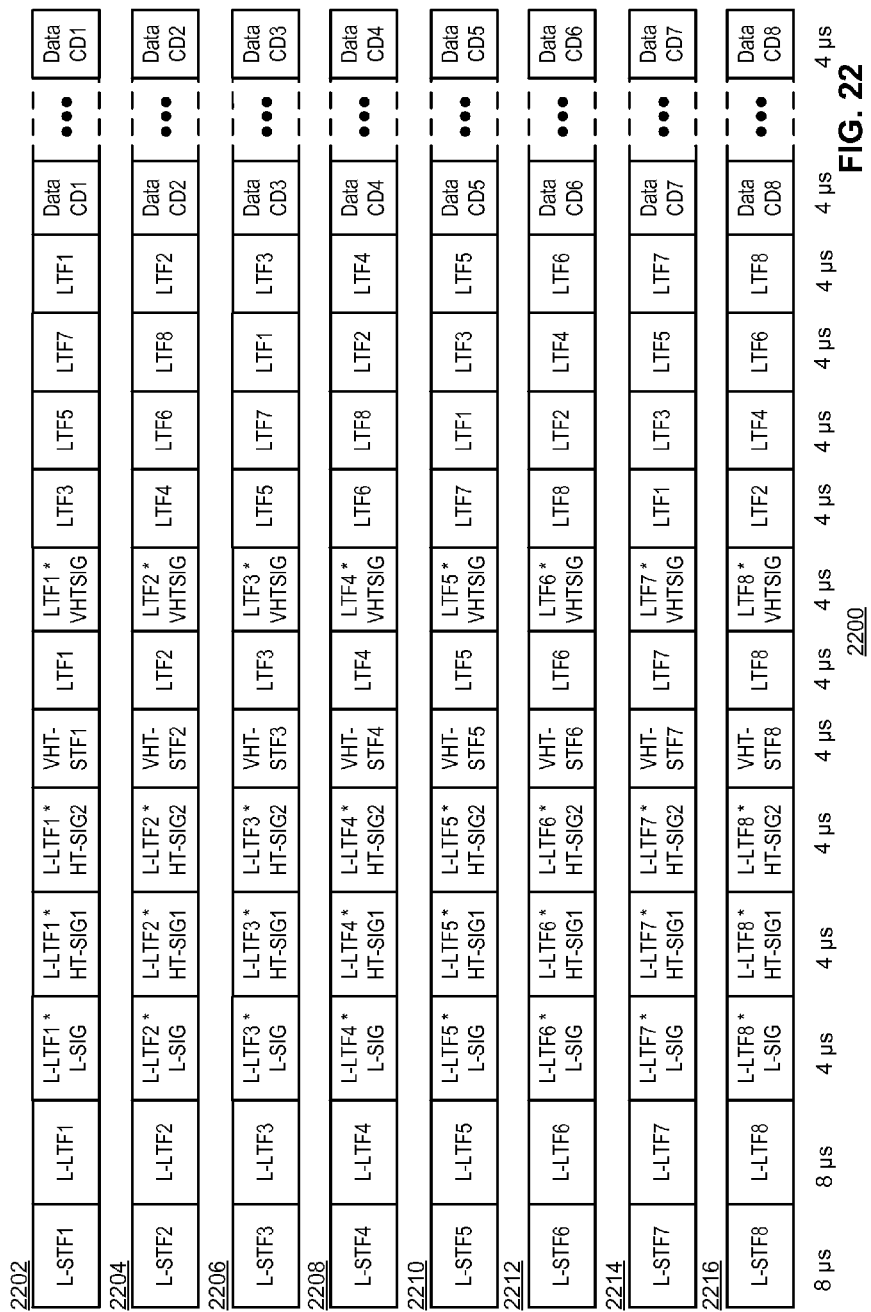
FIG. 22 is a diagram depicting an exemplary alternative VHT Mixed-Mode frame format for open loop MIMO.

FIG. 22 is a diagram depicting a set of example alternative VHT-MM frame formats 2200 for open loop MIMO, which includes alternative VHT-MM frame formats 2202, 2204, 2206, 2208, 2210, 2212, 2214, and 2216.

Figure 23:
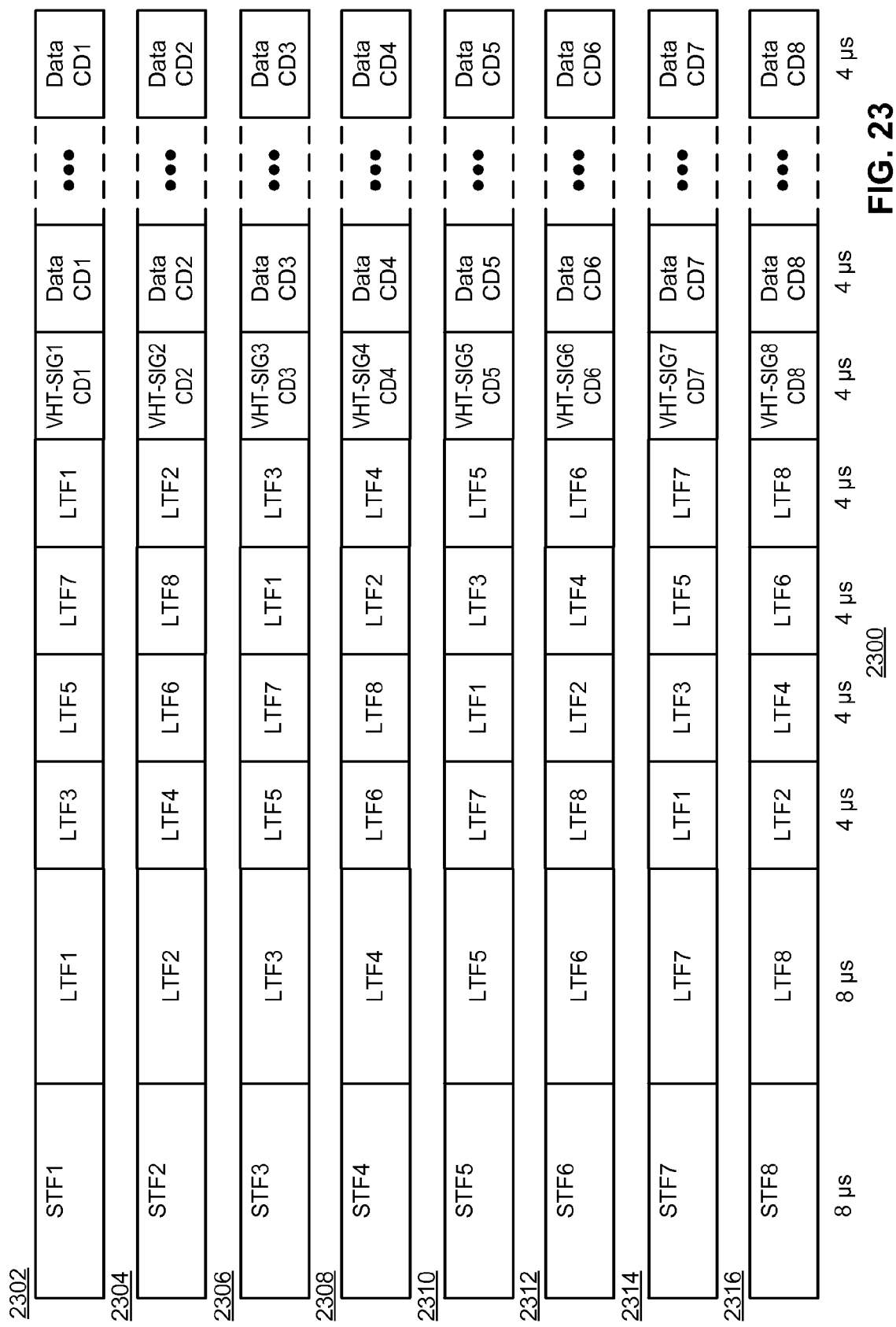
FIG. 23 is a diagram depicting an exemplary alternative uplink frame format.

FIG. 23 is a diagram depicting a set of example alternative uplink frame formats 2300, which includes alternative uplink frame formats 2302, 2304, 2306, 2308, 2310, 2312, 2314, and 2316. Each uplink user uses a different subset of the available spatial streams ranging from 1-8 or 1-16. There is no mixed-mode preamble as it is assumed that there will always be an AP packet indicating the start of the uplink SDMA transmit operation.

VHT-SIG comes after all LTF symbols because the AP needs to do a MIMO detection on the different VHT-SIG per user. If a user transmits more than one spatial stream, its VHT-SIG content is the same on all streams it transmits. AP needs to know in advance how many spatial stream each user has. Uplink frame format may not be used for open-loop MIMO because it is not known in advance how many spatial streams there are, so there is a need to have a VHT SIG before all channel trainings.

In FIGS. 20-23, only half of the LTF tones on each spatial stream are transmitted, such that interpolation is required to obtain all the tones. In FIGS. 24-29 described below, all LTF tones are transmitted on all spatial streams. The increased number of LTF symbols has the advantage of simpler receiver processing.

Figure 24:
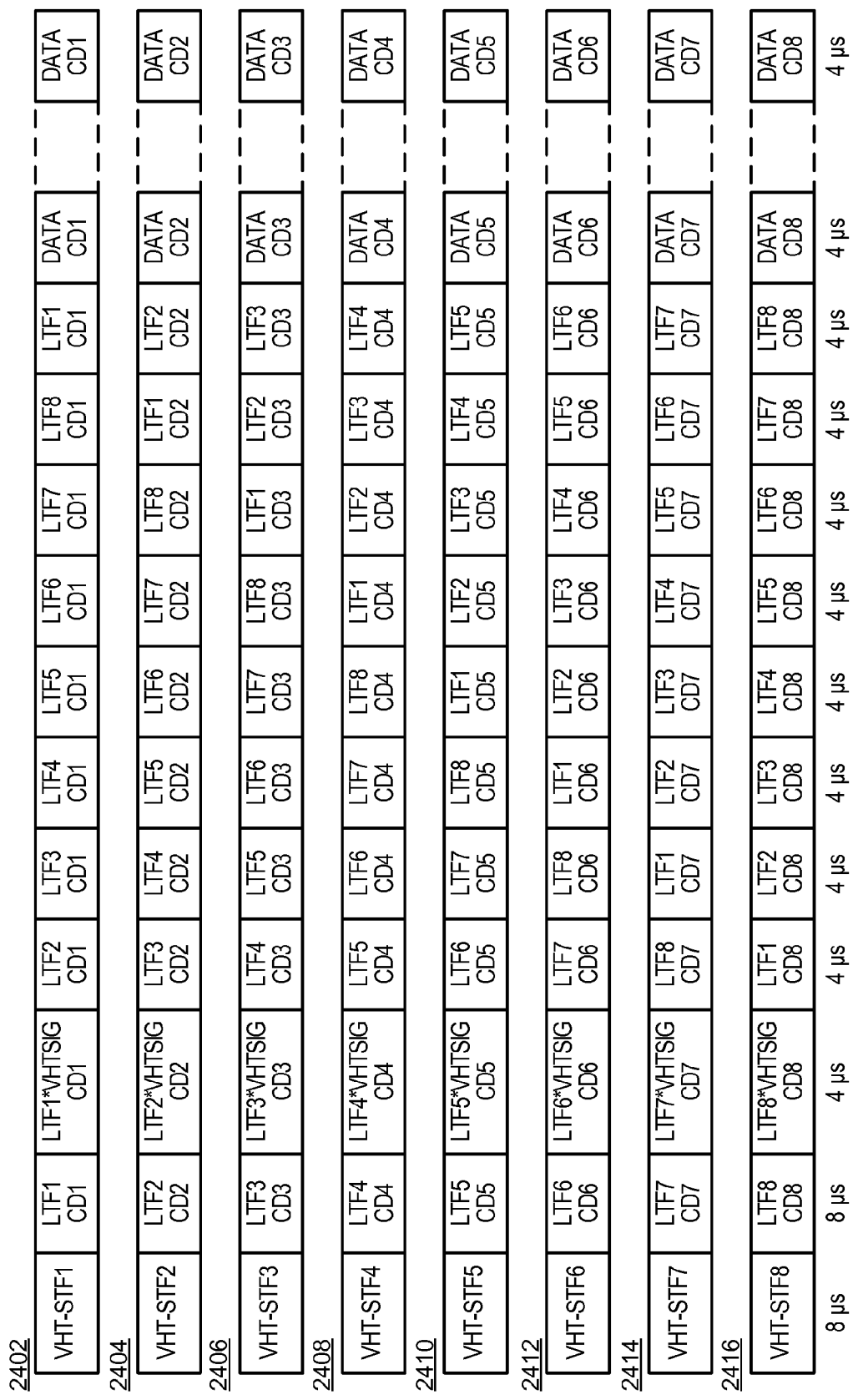
FIG. 24 is a diagram depicting an exemplary alternative VHT Greenfield frame format.

FIG. 24 is a diagram depicting a set 2400 of example alternative VHT Greenfield frame formats, which include alternative VHT-GF frame formats 2402, 2404, 2406, 2408, 2410, 2412, 2414, and 2416. These frame formats may be used in VHT-only networks or in a TXOP preceded by an 11n NAV setting. The frame formats 2402, 2404, 2406, 2408, 2410, 2412, 2414, and 2416 of FIG. 24 are similar to the frame formats 2002, 2004, 2006, 2008, 2010, 2012, 2014, and 2016 of FIG. 20, but include all of the LTF tones in each spatial stream. For example, frame format 2402 includes LTF1-LTF8, whereas frame format 2002 in FIG. 20 only includes LTF1, LTF3, LTF5 and LTF7.

The preamble length including VHT-SIG may be 52 microseconds for 8 spatial streams. The VHT-GF frame format in FIG. 24 may be extended to 16 spatial streams by adding 8 more LTFs. Data symbols may be absent in a null data packet (NDP) used for explicit sounding, or for calibration support for implicit sounding.

In FIG. 24, VHT-SIG uses QPSK instead of BPSK to save a symbol. The VHT-SIG subcarriers are multiplied by LTF frequency domain values, which enables SIMO decoding of VHT-SIG using the first received LTF symbol as a channel estimate. The notation "LTF1*VHT-SIG" means an element-wise multiplication per subcarrier. Each VHT-SIG subcarrier is multiplied by the corresponding LTF subcarrier value. The LTF symbols are tone interleaved. LTF has non-zero elements only at subcarriers i+kNss, where Nss is the number of spatial streams per user, k={0, 1, ... floor(N/Nss)}, and N is the total number of tones.

The tone-interleaved LTF symbols may decrease the impact of residual frequency errors on LTF. Channel training in 11n using Walsh-coded HT-LTF symbols is sensitive to residual frequency error and has the following effects: (1) increased inter-channel interference (ICI), although this is a minor effect as long as frequency errors are <1% of subcarrier spacing, and (2) loss of orthogonality of Walsh encoding, which is a more significant effect that becomes larger the longer the training period. There is no easy way to estimate and correct different frequency offsets from a Walsh encoded channel training. However, by utilizing tone-interleaved LTF symbols, there is no Walsh orthogonality loss because on each subcarrier in every symbol, there is just one active stream instead of a sum of all streams. Furthermore, the last LTF symbol is a repetition of the first symbol to provide a simple and accurate way to estimate residual frequency across the channel estimation interval.

A VHT receiver may discriminate between an 11n packet and a VHT Greenfield packet by detecting inverted pilots in VHT-SIG (inverted with respect to 11n pilots). An alternative may be to detect QPSK as opposed to BPSK for an 11n HT-SIG.

Figure 25:
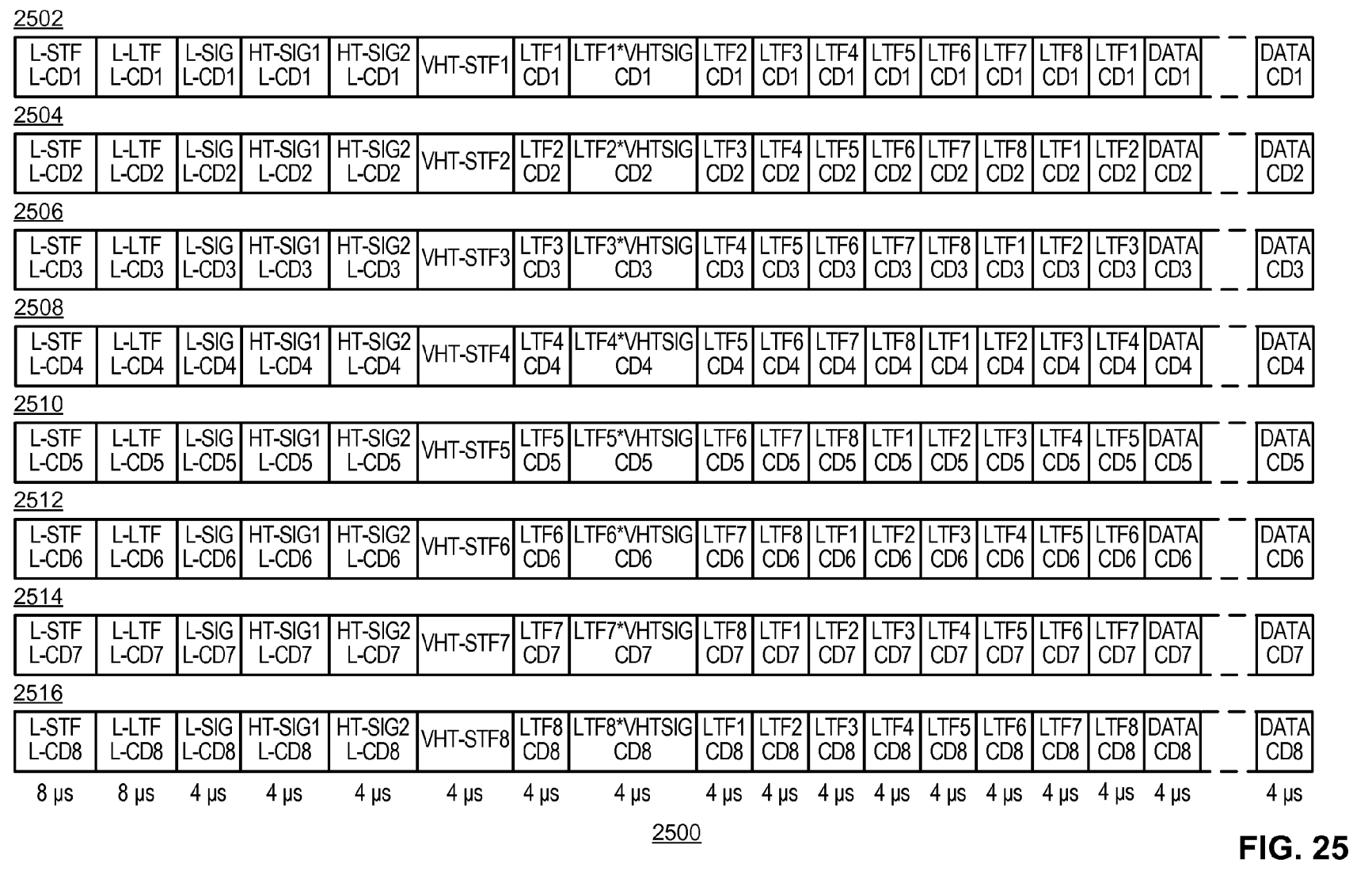

FIG. 25 is a diagram depicting a set 2500 of example alternative VHT-MM frame formats, which includes alternative VHT-MM frame formats 2502, 2504, 2506, 2508, 2510, 2512, 2514, and 2516. These frame formats provide coexistence with 11n. For example, the first portion of the preamble up to HT-SIG is fully IEEE 802.11n compliant and uses the 11n BPSK spoof rate. A VHT receiver can detect VHT-MM by distinguishing between BPSK data symbol and VHT-SIG using rotated BPSK. Legacy 11n devices need not defer if the reserved HT-SIG bits are not set as prescribed in IEEE 802.11n.

The frame formats 2502, 2504, 2506, 2508, 2510, 2512, 2514, and 2516 of FIG. 25 are similar to the frame formats 2202, 2204, 2206, 2208, 2210, 2212, 2214, and 2216 of FIG. 22, but include all of the LTF tones in each spatial stream for the latter VHT portion of the preamble. For example, frame format 2502 includes LTF1-LTF8 in the latter VHT portion of the preamble, whereas frame format 2202 in FIG. 22 only includes LTF1, LTF3, LTF5 and LTF7.

In the VHT-MM frame formats 2502, 2504, 2506, 2508, 2510, 2512, 2514, and 2516, the preamble length including VHT-SIG is 72 microseconds for 8 spatial streams. The VHT Mixed-Mode frame format in FIG. 25 may be extended to 16 spatial streams by adding 8 more LTFs. Data symbols may be absent in a null data packet (NDP) used for explicit sounding, or for calibration support for implicit sounding.

The VHT-SIG subcarriers are multiplied by LTF frequency domain values, which enables SIMO decoding of VHT-SIG using the first received LTF symbol for channel estimation. VHT-SIG cannot directly follow HT-SIG because of the automatic gain control (AGC) setting that is performed immediately after HT-SIG on VHT-STF.

In FIG. 25, the cyclic delay values (CDi) in the latter portion of the preamble may be multiples of −200 ns, the same values used in LTFi if cyclic delayed LTF symbols are utilized. The legacy cyclic delay values (L-CDi) may be multiples of −50 ns.

FIG. 26 is a diagram depicting a set 2600 of example alternative VHT Greenfield frame formats for SDMA with MMSE-ES, which includes alternative VHT-GF frame formats 2602, 2604, 2606, 2608, 2610, 2612, 2614, and 2616. Each user may have 1 to 8 spatial streams. In the example of FIG. 26, 4 users have 1 spatial stream each, and 1 user has 4 spatial streams. Since there is different precoding on different parts of the preamble in FIG. 26, a VHT-STF is used to set the receive gain on every precoding transition.

Figure 27:
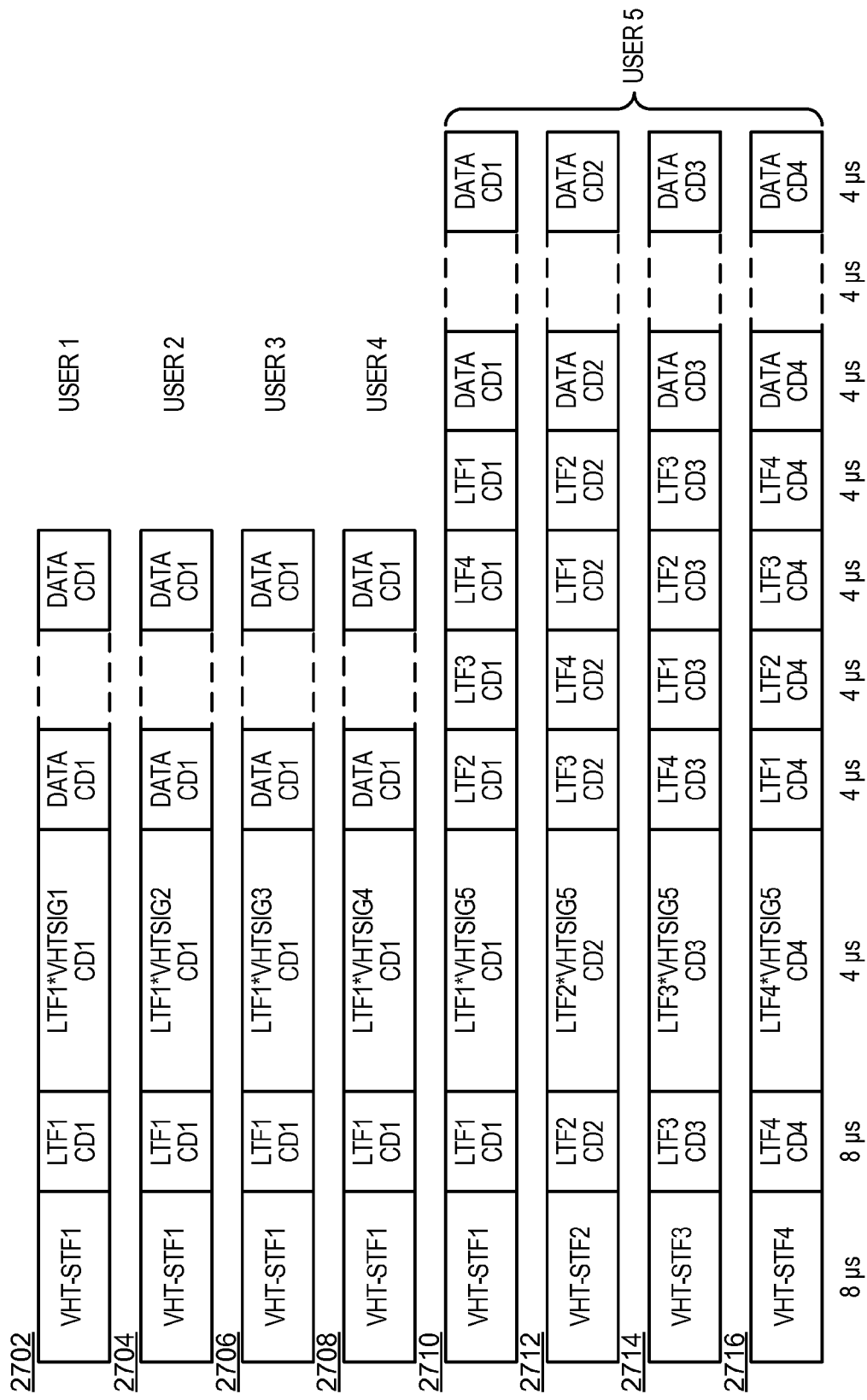
FIG. 27 is a diagram depicting an exemplary alternative VHT Greenfield frame format for SDMA with MMSE.

FIG. 27 is a diagram depicting a set 2700 of example alternative VHT Greenfield frame formats for SDMA with MMSE, which includes alternative VHT-GF frame formats 2702, 2704, 2706, 2708, 2710, 2712, 2714, and 2716. With these frame formats, each user can have 1 to 8 spatial streams, resulting in different preamble lengths per user. In the example of FIG. 27, users 1-4 have one LTF symbol with all tones, while user 5 has tone interleaved LTF symbols for 4 spatial streams.

Figure 28B:
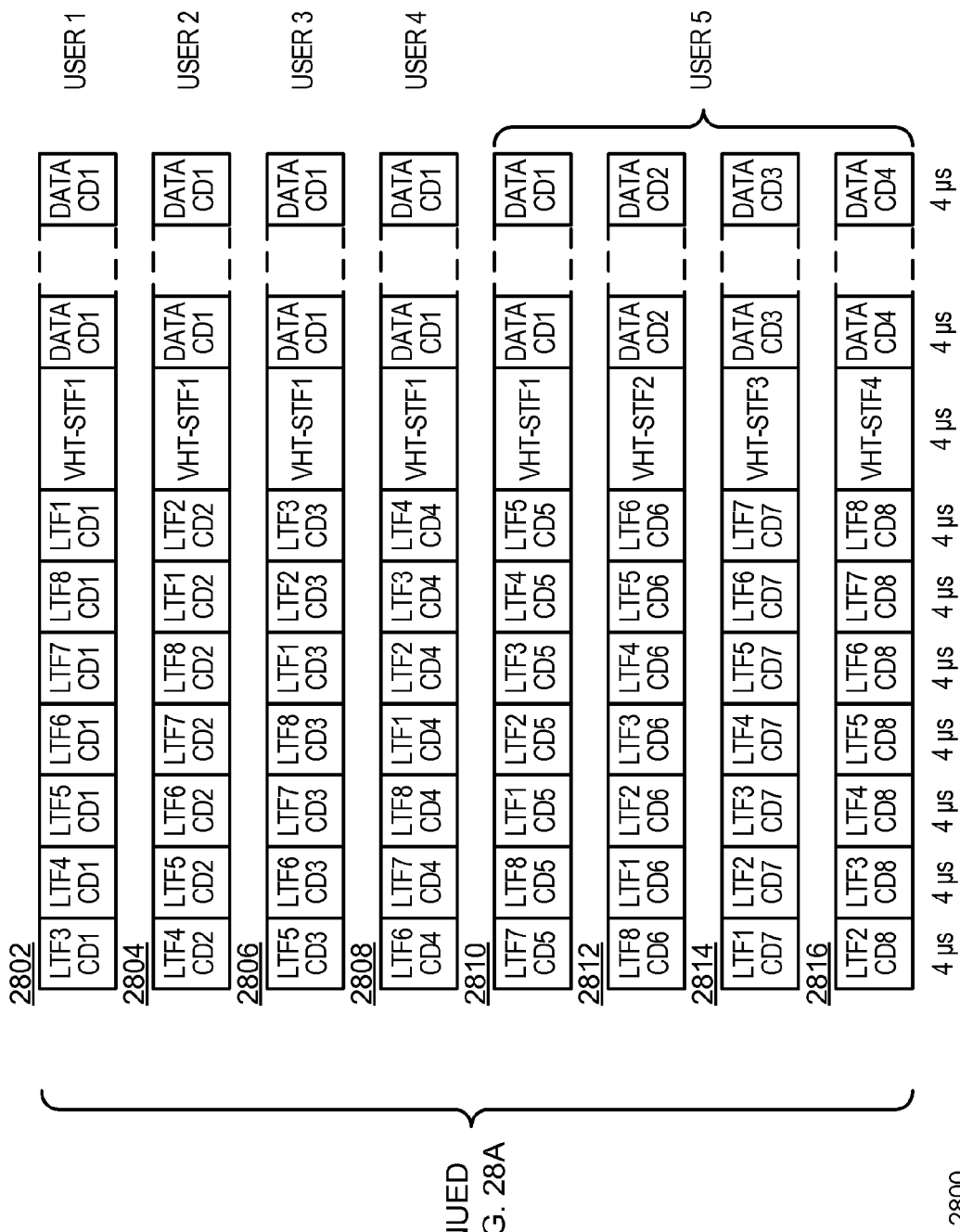
FIG. 28 is a diagram depicting an exemplary alternative VHT Mixed-Mode frame format for SDMA with MMSE-ES and spanning two pages of drawings such that the spatial streams of FIG. 28B follow the spatial streams of FIG. 28A to illustrate the frame format.

FIG. 28 is a diagram depicting a set 2800 of example alternative VHT Mixed-Mode frame formats for SDMA with MMSE-ES, which includes alternative VHT-MM frame formats 2802, 2804, 2806, 2808, 2810, 2812, 2814, and 2816. Each user can have 1 to 8 spatial streams, and the example of FIG. 28 illustrates 4 users with 1 spatial stream each and 1 user with 4 spatial streams. Since there is different precoding on different parts of the preamble in FIG. 28, a VHT-STF is used to set the receive gain on every precoding transition.

Figure 29:
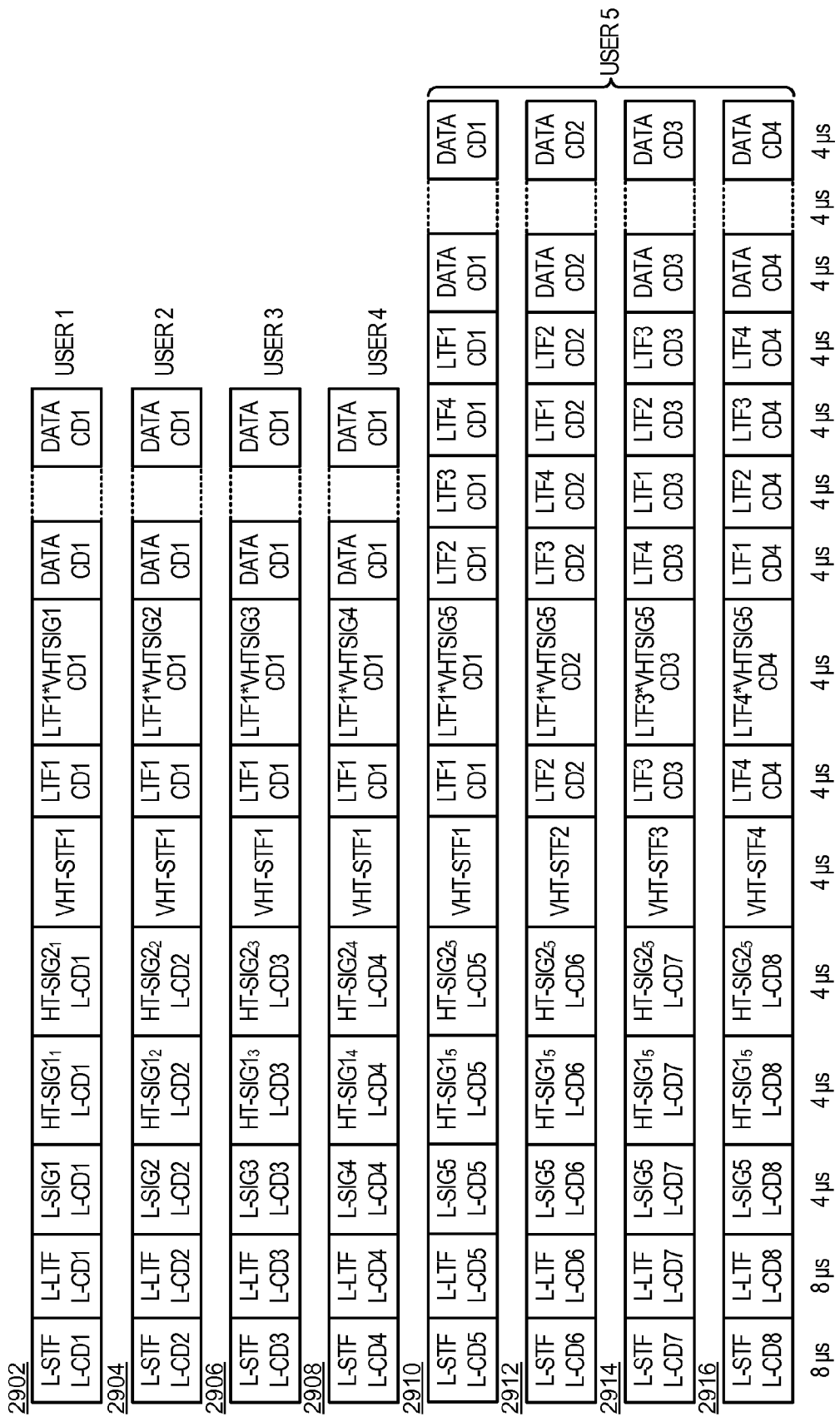
FIG. 29 is a diagram depicting an exemplary alternative VHT Mixed-Mode frame format for SDMA with MMSE.

FIG. 29 is a diagram depicting a set 2900 of example alternative VHT Mixed-Mode frame formats for SDMA with MMSE, which includes alternative VHT-MM frame formats 2902, 2904, 2906, 2908, 2910, 2912, 2914, and 2916. With these frame formats, each user can have 1 to 8 spatial streams, resulting in different preamble lengths per user. In the example of FIG. 29, users 1-4 have one LTF symbol with all tones in at least the latter VHT portion of the preamble, while user 5 has tone interleaved LTF symbols for 4 spatial streams in at least the latter VHT portion of the preamble.

Figure 30:
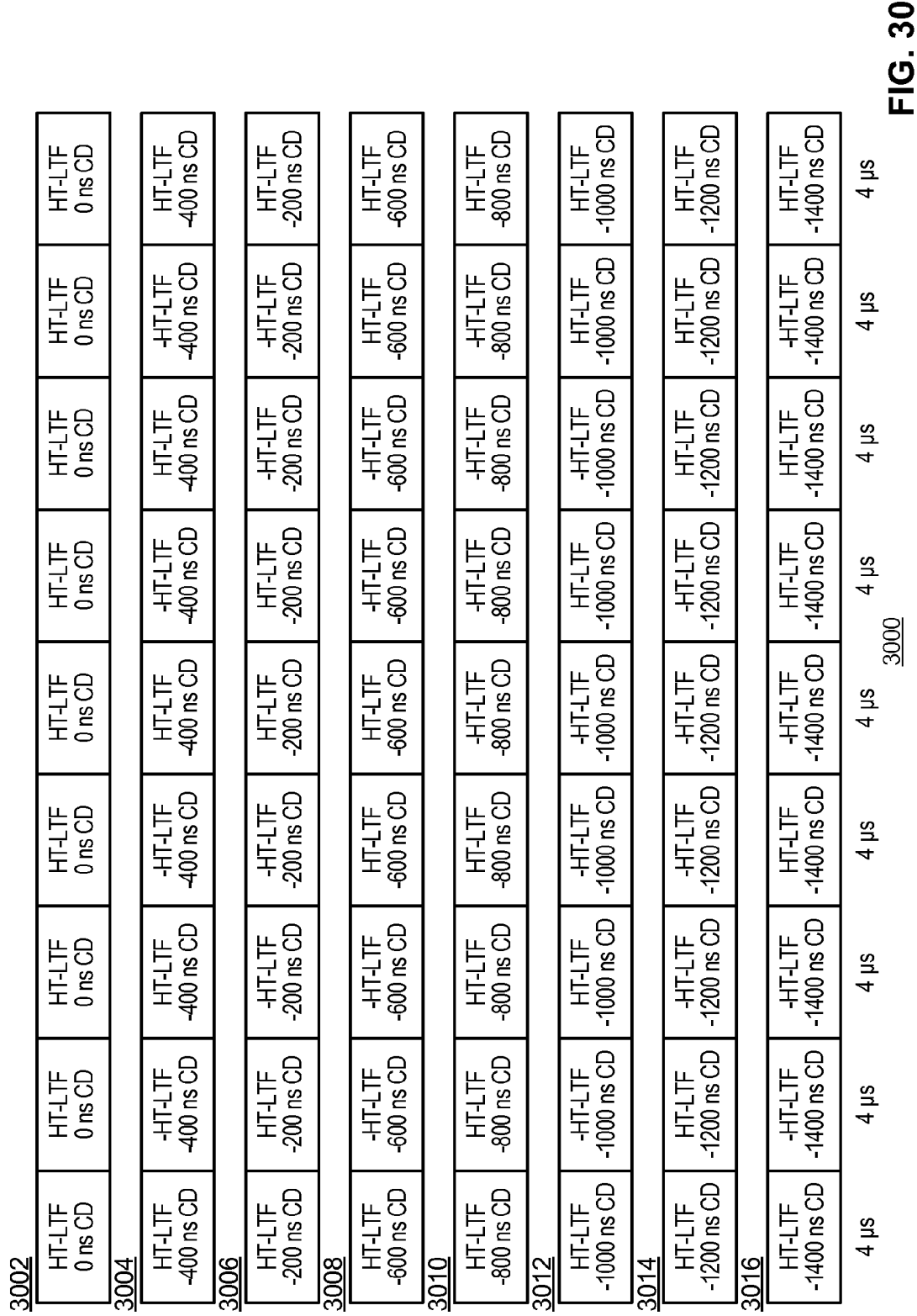
FIG. 30 is a diagram depicting exemplary Walsh encoded channel training for eight spatial streams.

FIG. 30 is a diagram depicting a set 3000 of example Walsh encoded channel training sequences 3002, 3004, 3006, 3008, 3010, 3012, 3014, and 3016 for eight spatial streams. In FIG. 30, the first symbol may be repeated eight times to form the training sequence of nine symbols as shown. The Walsh pattern can be changed as long as the overall pattern remains orthogonal. This means all HT-LTF symbols in a spatial stream can change sign (i.e., polarity), and the sign of any symbol number can be changed for all spatial streams.

With the Walsh encoded channel training sequences, the first HT-LTF symbol may appear in the preamble before HT-SIG, similar to other Greenfield preambles described above. For some embodiments, there can be a VHT-SIG field inserted after the first HT-LTF symbol, as in other mixed-mode preambles described above. There may be more subcarriers in the HT-LTF symbols than in the 11n HT-LTF symbols in case 60 or 80 MHz channels are used.

FIG. 31 is a diagram depicting a set 3100 of example Walsh encoded channel training sequences 3102, 3104, 3106, 3108, 3110, 3112, and 3114 for SDMA. In FIG. 31, user 1 has two streams, and user 2 has five streams As described herein, certain aspects of the present disclosure provide a method of transmitting one or more preambles to a plurality of stations. As described herein, the sequence of symbols in the preamble consists of one part which is transmitted in a non-beamformed fashion and another part which is transmitted using beamforming.

According to certain aspects, the non-beamformed part of the preamble may comprise an 802.11n mixed mode preamble up to the second symbol of the HT signal field. According to certain aspects, the preamble may be followed by steered MU-MIMO data. According to certain aspects, the beamformed part of the preamble may comprise a first symbol, which is a short training field used for AGC setting by the STA. According to certain aspects, the beamformed part of the preamble may comprise a second symbol comprising a training field which temporally follows the first symbol.

According to certain aspects, the training field may be used to estimate the channel needed to demodulate the symbols following the training field. According to certain aspects, the symbols following the training field comprise a signal field. According to certain aspects, the signal field may be different for at least two of the STAs.

According to certain aspects, the length and MCS of the transmission in the signal field present in the HT part of the mixed mode 11n preamble may be chosen to convey the duration of the longest of the steered MU-MIMO transmissions which follow the preamble.

According to certain aspects, the signal field may be used to do mode detection using a specific modulation scheme. According to certain aspects, mode detection may comprise deciding whether it is an 802.11n or an 802.11ac transmission. According to certain aspects, the specific modulation scheme may comprise inverting the pilots relative to the data. According to certain aspects, the specific modulation scheme may comprise rotated BPSK.

According to certain aspects, the symbols may comprise a single symbol modulated using QPSK.

It is understood that any specific order or hierarchy of steps described above is being presented to provide an example of the process involved in preamble unit. Based upon design preferences, it is understood that the specific order or hierarchy of steps may be rearranged while remaining within the scope of the invention.

The preamble unit, the OFDM modulator, and the OFDM demodulator may be implemented with one or more general purpose processors, digital signal processors (DSPs), application specific integrated circuits (ASICs), field programmable gate array (FPGAs), programmable logic devices (PLDs), other programmable logic components, discrete gate or transistor logic, discrete hardware components, or any combination thereof designed to perform the functions described herein. A general purpose processor may be a microprocessor, a controller, a microcontroller, a state machine or any other circuitry that can execute software. Software shall be construed broadly to mean instructions, data or any combination thereof, whether referred to as software, firmware, middleware, microcode, hardware description language, or otherwise. Software may be stored on machine-readable media or embedded in one or more components such as a DSP or ASIC. Machine-readable media may include various memory components including, by way of example, Random Access Memory (RAM), flash memory, Read Only Memory (ROM), Programmable Read-Only Memory (PROM), Erasable Programmable Read-Only Memory (EPROM), Electrically Erasable Programmable Read-Only Memory (EEPROM), registers, magnetic disks, optical disks, hard drives, or any other suitable storage medium, or any combination thereof. Machine-readable media may also be include a transmission line, a carrier wave modulated by data, and/or other means for providing software to the wireless node. The machine-readable may be embodied in a computer-program product. The computer-program product may comprise packaging materials.

Whether the above mentioned units are implemented in hardware, software, or a combination thereof will depend upon the particular application and design constraints imposed on the overall system. Skilled artisans may implement the described functionality in varying ways for each particular application, but such implementation decisions should not be interpreted as causing a departure from the scope of the invention.

The previous description is provided to enable any person skilled in the art to fully understand the full scope of the invention. Modifications to the various configurations disclosed herein will be readily apparent to those skilled in the art. Thus, the claims are not intended to be limited to the various aspects of the invention described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus for communications, comprising:
at least one processor configured to generate a frame comprising a preamble portion having at least four symbols as associated with at least three signal (SIG) fields comprising a first SIG field and a second SIG field both conforming to a legacy standard and a third SIG field indicating a non-legacy mode, wherein the preamble portion further comprises a training sequence; and
a transmitter configured to transmit the frame;
wherein the training sequence comprises a number of modulated symbols, wherein at least a portion of the training sequence is distributed across a first symbol in a set of at least four transmit chains comprising a first transmit chain and a second symbol in a second transmit chain, and sign of one third SIG field in one of the at least four transmit chains differs from a sign of each third SIG field in three of the at least four transmit chains.

2. The apparatus of claim 1, wherein all tones of the training sequence are transmitted in a spatial stream.

3. The apparatus of claim 1, wherein the training sequence is distributed across at least eight symbols designated as long training fields (LTFs).

4. The apparatus of claim 1, wherein the training sequence comprises a Walsh encoded training sequence.

5. The apparatus of claim 1, wherein the first SIG field of the at least three SIG fields comprises a non-high-throughput (non-HT) SIG field.

6. The apparatus of claim 1, wherein the first SIG field of the at least three SIG fields comprises a first symbol of the at least four symbols.

7. The apparatus of claim 1, wherein at least one of the at least three SIG fields comprises a very high throughput signal (VHT-SIG) field and wherein the VHT-SIG field is located after the last very high throughput long training field (VHT-LTF) in the preamble portion.

8. The apparatus of claim 1, wherein the at least one processor is further configured to modulate at least one of the at least four symbols with a rotated binary phase-shift keying (BPSK) modulation scheme and wherein the rotated BPSK modulation scheme is used to indicate that the preamble portion includes the at least three signal (SIG) fields.

9. The apparatus of claim 1, wherein the preamble portion further comprises at least one of a non-high-throughput (non-HT) short training field (STF) or a non-HT long training field (LTF).

10. The apparatus of claim 6, wherein the second SIG field of the at least three SIG fields comprises a second symbol and a third symbol of the at least four symbols and wherein the second and third symbols are subsequent to the first symbol.

11. The apparatus of claim 10, wherein the third SIG field of the at least three SIG fields comprises a fourth symbol of the at least four symbols, subsequent to the second and third symbols.

12. The apparatus of claim 11, wherein the third SIG field has at least one of a different sign or a different cyclic delay than the second SIG field.

13. The apparatus of claim 11, wherein pilot signals in the third SIG field are inverted to indicate that the preamble portion includes the third SIG field.

14. A method for communications, comprising:
generating a frame comprising a preamble portion having at least four symbols associated with at least three signal (SIG) fields comprising a first SIG field and a second SIG field both conforming to a legacy standard and a third SIG field indicating a non-legacy mode, wherein the preamble portion further comprises a training sequence; and
transmitting the frame;
wherein the training sequence comprises a number of modulated symbols, wherein at least a portion of the training sequence is distributed across a first symbol in a set of at least four transmit chains comprising a first transmit chain and a second symbol in a second transmit chain, and sign of one third SIG field in one of the at least four transmit chains differs from a sign of each third SIG field in three of the at least four transmit chains.

15. The method of claim 14, wherein all tones of the training sequence are transmitted in a spatial stream.

16. The method of claim 14, wherein the training sequence is distributed across at least eight symbols designated as long training fields (LTFs).

17. The method of claim 14, wherein the training sequence comprises a Walsh encoded training sequence.

18. The method of claim 14, wherein the first SIG field of the at least three SIG fields comprises a non-high-throughput (non-HT) SIG field.

19. The method of claim 14, wherein the first SIG field of the at least three SIG fields comprises a first symbol of the at least four symbols.

20. The method of claim 14, wherein at least one of the at least three SIG fields comprises a very high throughput signal (VHT-SIG) field and wherein the VHT-SIG field is located after the last very high throughput long training field (VHT-LTF) in the preamble portion.

21. The method of claim 14, further comprising modulating at least one of the at least four symbols with a rotated binary phase-shift keying (BPSK) modulation scheme, wherein the rotated BPSK modulation scheme is used to indicate that the preamble portion includes the at least three signal (SIG) fields.

22. The method of claim 14, wherein the preamble portion further comprises at least one of a non-high-throughput (non-HT) short training field (STF) or a non-HT long training field (LTF).

23. The method of claim 19, wherein the second SIG field of the at least three SIG fields comprises a second symbol and a third symbol of the at least four symbols, subsequent to the first symbol.

24. The method of claim 23, wherein the third SIG field of the at least three SIG fields comprises a fourth symbol of the at least four symbols, subsequent to the second and third symbols.

25. The method of claim 24, wherein the third SIG field has at least one of a different sign or a different cyclic delay than the second SIG field.

26. The method of claim 24, wherein pilot signals in the third SIG field are inverted to indicate that the preamble portion includes the third SIG field.

27. An apparatus for communications, comprising:
means for generating a frame comprising a preamble portion having at least four symbols associated with at least three signal (SIG) fields comprising a first SIG field and a second SIG field both conforming to a legacy standard and a third SIG field indicating a non-legacy mode, wherein the preamble portion further comprises a training sequence; and
means for transmitting the frame;
wherein the training sequence comprises a number of modulated symbols, wherein at least a portion of the training sequence is distributed across a first symbol in a set of at least four transmit chains comprising a first transmit chain and a second symbol in a second transmit chain, and sign of one third SIG field in one of the at least four transmit chains differs from a sign of each third SIG field in three of the at least four transmit chains.

28. The apparatus of claim 27, wherein all tones of the training sequence are transmitted in a spatial stream.

29. The apparatus of claim 27, wherein the training sequence is distributed across at least eight symbols designated as long training fields (LTFs).

30. The apparatus of claim 27, wherein the training sequence comprises a Walsh encoded training sequence.

31. The apparatus of claim 27, wherein the first SIG field of the at least three SIG fields comprises a non-high-throughput (non-HT) SIG field.

32. The apparatus of claim 27, wherein the first SIG field of the at least three SIG fields comprises a first symbol of the at least four symbols.

33. The apparatus of claim 27, wherein at least one of the at least three SIG fields comprises a very high throughput signal (VHT-SIG) field and wherein the VHT-SIG field is located after the last very high throughput long training field (VHT-LTF) in the preamble portion.

34. The apparatus of claim 27, further comprising means for modulating at least one of the at least four symbols with a rotated binary phase-shift keying (BPSK) modulation scheme, wherein the rotated BPSK modulation scheme is used to indicate that the preamble portion includes the at least three signal (SIG) fields.

35. The apparatus of claim 27, wherein the preamble portion further comprises at least one of a non-high-throughput (non-HT) short training field (STF) or a non-HT long training field (LTF).

36. The apparatus of claim 32, wherein the second SIG field of the at least three SIG fields comprises a second symbol and a third symbol of the at least four symbols, and wherein the second and third symbols are subsequent to the first symbol.

37. The apparatus of claim 36, wherein the third SIG field of the at least three SIG fields comprises a fourth symbol of the at least four symbols, subsequent to the second and third symbols.

38. The apparatus of claim 37, wherein the third SIG field has at least one of a different sign or a different cyclic delay than the second SIG field.

39. The apparatus of claim 37, wherein pilot signals in the third SIG field are inverted to indicate that the preamble portion includes the third SIG field.

40. A computer-program product for wireless communication, comprising:
a non-transitory machine-readable medium encoded with instructions executable to:
generate a frame comprising a preamble portion having at least four symbols associated with at least three signal (SIG) fields comprising a first SIG field and a second SIG field both conforming to a legacy standard and a third SIG field indicating a non-legacy mode, wherein the preamble portion further comprises a training sequence; and
transmit the frame;
wherein the training sequence comprises a number of modulated symbols, wherein at least a portion of the training sequence is distributed a first symbol in a set of at least four transmit chains comprising a first transmit chain and a second symbol in a second transmit chain, and sign of one third SIG field in one of the at least four transmit chains differs from a sign of each third SIG field in three of the at least four transmit chains.

41. An access point, comprising:
at least one antenna;
at least one processor configured to generate a frame comprising a preamble portion having at least four symbols associated with at least three signal (SIG) fields comprising a first SIG field and a second SIG field both conforming to a legacy standard and a third SIG field indicating a non-legacy mode, wherein the preamble portion further comprises a training sequence; and
a transmitter configured to transmit the frame via the at least one antenna;
wherein the training sequence comprises a number of modulated symbols, wherein at least a portion of the training sequence is distributed across a first symbol in a set of at least four transmit chains comprising a first transmit chain and a second symbol in a second transmit chain, and sign of one third SIG field in one of the at least four transmit chains differs from a sign of each third SIG field in three of the at least four transmit chains.

42. An access terminal, comprising:
at least one processor configured to generate a frame comprising a preamble portion having at least four symbols associated with at least three signal (SIG) fields comprising a first SIG field and a second SIG field both conforming to a legacy standard and a third SIG field indicating a non-legacy mode, wherein the preamble portion further comprises a training sequence;
a transmitter configured to transmit the frame; and
a user interface supported by the at least one processor;
wherein the training sequence comprises a number of modulated symbols, wherein at least a portion of the training sequence is distributed across a first symbol in a set of at least four transmit chains comprising a first transmit chain and a second symbol in a second transmit chain, and sign of one third SIG field in one of the at least four transmit chains differs from a sign of each third SIG field in three of the at least four transmit chains.

* * * * *